United States Patent
Smith

(10) Patent No.: US 12,442,623 B2
(45) Date of Patent: Oct. 14, 2025

(54) ELECTRODE DEPLOYMENT BASED ON CHANGE IN POSITION

(71) Applicant: Axon Enterprise, Inc., Scottsdale, AZ (US)

(72) Inventor: Patrick W. Smith, Scottsdale, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 194 days.

(21) Appl. No.: 18/268,913

(22) PCT Filed: Dec. 21, 2021

(86) PCT No.: PCT/US2021/064523
§ 371 (c)(1),
(2) Date: Jun. 21, 2023

(87) PCT Pub. No.: WO2022/140329
PCT Pub. Date: Jun. 30, 2022

(65) Prior Publication Data
US 2024/0295387 A1    Sep. 5, 2024

Related U.S. Application Data

(60) Provisional application No. 63/128,718, filed on Dec. 21, 2020.

(51) Int. Cl.
*F41H 13/00*    (2006.01)

(52) U.S. Cl.
CPC .............................. *F41H 13/0025* (2013.01)

(58) Field of Classification Search
CPC .............................. F41H 13/0025; F41B 15/04
(Continued)

(56) References Cited

U.S. PATENT DOCUMENTS

| 8,020,481 B1 | 9/2011 | Beckwith |
| 10,473,438 B2 | 11/2019 | Nerheim et al. |

(Continued)

FOREIGN PATENT DOCUMENTS

| CN | 102155872 A1 | 8/2011 |
| CN | 109737808 A | 5/2019 |
| EP | 1762812 A1 | 3/2007 |

OTHER PUBLICATIONS

Taiwan Patent Office, Office Action for Taiwan Application No. 110147915 mailed Aug. 12, 2022.
(Continued)

*Primary Examiner* — Sreeya Sreevatsa
(74) *Attorney, Agent, or Firm* — Andrew Graham

(57) ABSTRACT

An electrode may be automatically deployed based on a change associated with a conducted electrical weapon. The change may comprise a change in position. The electrode may be automatically deployed after a previous electrode is deployed from the conducted electrical weapon and the change in position is detected. A position of the conducted electrical weapon may be detected via a position sensor included in the conducted electrical weapon. The change in position may include an angle of orientation. The angle of orientation may be determined between a first direction in which the previous electrode was deployed and a current direction in which the conducted electrical weapon is oriented. The change in position may comprise a distance. The distance may be determined between a first spatial location of the conducted electrical weapon at a which the previous electrode was deployed and a current spatial location of the conducted electrical weapon.

20 Claims, 8 Drawing Sheets

(58) Field of Classification Search
USPC .......................................................... 361/230
See application file for complete search history.

(56) References Cited

U.S. PATENT DOCUMENTS

| | | | |
|---|---|---|---|
| 10,809,040 | B2 | 10/2020 | Kim |
| 2009/0020002 | A1 | 1/2009 | Williams et al. |
| 2014/0098453 | A1* | 4/2014 | Brundula .................. F41H 5/24 |
| | | | 361/232 |
| 2018/0058825 | A1 | 3/2018 | Hyde et al. |
| 2020/0109925 | A1* | 4/2020 | Goodchild .......... F41H 13/0025 |
| 2020/0109926 | A1* | 4/2020 | Mata ........................ G01P 15/18 |
| 2020/0284556 | A1 | 9/2020 | Nemtyshkin et al. |
| 2022/0228841 | A1* | 7/2022 | Smith ....................... F41A 9/61 |

OTHER PUBLICATIONS

International Searching Authority, International Search Report for International Application No. PCT/US2021/064523 mailed Apr. 15, 2022.
Taiwan Patent Office, Primary Examination for Taiwanese Application No. 112135278 mailed Oct. 25, 2023.
Taiwan Patent Office, Allowance Decision of Examination for Taiwanese Application No. 112135278 mailed Jun. 24, 2024.
European Patent Office, Extended European Search Report for European Application No. 21912013.6 mailed Oct. 11, 2024.
Canadian Intellectual Property Office, Office Action for Canadian Application No. 3,174,195 mailed Mar. 13, 2024.

* cited by examiner

ELECTRODE DEPLOYMENT BASED ON CHANGE IN POSITION

FIELD OF THE INVENTION

Embodiments of the present disclosure relate to a conducted electrical weapon. Specifically, the conducted electrical weapon may be configured to deploy one or more electrodes based on a change in position associated with the conducted electrical weapon.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1:
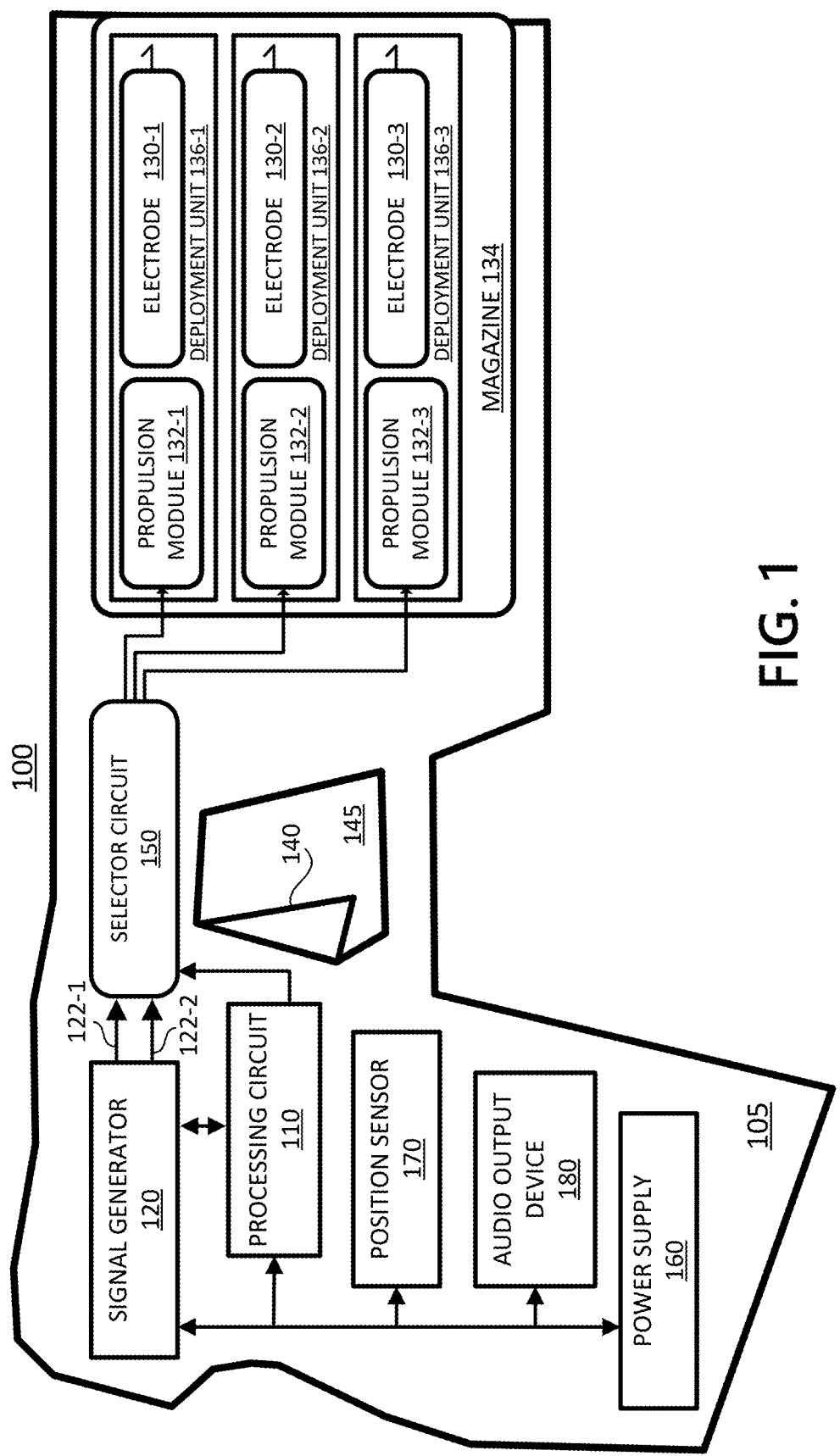
FIG. 1 illustrates a schematic diagram of a conducted electrical weapon, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected, or the like may include permanent, removable, temporary, partial, full, and/or any other possible attachment option. Additionally, any reference to without contact (or similar phrases) may also include reduced contact or minimal contact. Surface shading lines may be used throughout the figures to denote different parts but not necessarily to denote the same or different materials.

Systems, methods, and apparatuses may be used to interfere with voluntary locomotion (e.g., walking, running, moving, etc.) of a target. For example, a conducted electrical weapon may be used to deliver (e.g., conduct) an electrical current (e.g., stimulus signal, pulses of current, pulses of charge, etc.) through tissue of a human or animal target. Although referred to as a conducted electrical weapon, in the present disclosure, a conducted electrical weapon ("CEW") may refer to an electrical weapon, a conductive electrical weapon, an energy weapon, a conducted energy weapon, and/or any other similar device or apparatus configured to provide a stimulus signal through one or more deployed projectiles (e.g., electrodes).

A stimulus signal carries an electrical charge into target tissue. The stimulus signal may interfere with voluntary locomotion of the target. The stimulus signal may cause pain. The pain may also function to encourage the target to stop moving. The stimulus signal may cause skeletal muscles of the target to become stiff (e.g., lock up, freeze, etc.). The stiffening of the muscles in response to a stimulus signal may be referred to as neuromuscular incapacitation ("NMI"). NMI disrupts voluntary control of the muscles of the target. The inability of the target to control its muscles interferes with locomotion of the target.

A stimulus signal may be delivered through the target via terminals coupled to the CEW. Delivery via terminals may be referred to as a local delivery (e.g., a local stun, a drive stun, etc.). During local delivery, the terminals are brought close to the target by positioning the CEW proximate to the target. The stimulus signal is delivered through the target's tissue via the terminals. To provide local delivery, the CEW is generally disposed within arm's reach of the target and the terminals of the CEW are brought into contact with or proximate to the target.

A stimulus signal may be delivered through the target via two or more wire-tethered electrodes. Delivery via wire-tethered electrodes may be referred to as a remote delivery (e.g., a remote stun). During a remote delivery, the CEW may be separated from the target up to the length (e.g., 15 feet, 20 feet, 30 feet, etc.) of the wire tether. The CEW launches the electrodes towards the target. As the electrodes travel toward the target, the respective wire tethers deploy behind the electrodes. The wire tether electrically couples the CEW to the electrode. The electrode may electrically couple to the target thereby coupling the CEW to the target. In response to the electrodes connecting with, impacting on, or being positioned proximate to the target's tissue, the current may be provided through the target via the electrodes (e.g., a circuit is formed through the first tether and the first electrode, the target's tissue, and the second electrode and the second tether).

Terminals or electrodes that contact or are proximate to the target's tissue deliver the stimulus signal through the target. Contact of a terminal or electrode with the target's tissue establishes an electrical coupling with the target's tissue. Electrodes may include a spear that may pierce the target's tissue to contact the target. A terminal or electrode that is proximate to the target's tissue may use ionization to establish an electrical coupling with the target's tissue. Ionization may also be referred to as arcing.

In use (e.g., during deployment), a terminal or electrode may be separated from the target's tissue by the target's clothing or a gap of air. In various embodiments, a signal generator of the CEW may provide the stimulus signal (e.g., current, pulses of current, etc.) at a high voltage (e.g., in the range of 40,000 to 100,000 volts) to ionize the air in the clothing or the air in the gap that separates the terminal or electrode from the target's tissue. Ionizing the air establishes a low impedance ionization path from the terminal or electrode to the target's tissue that may be used to deliver the stimulus signal into the target's tissue via the ionization path. The ionization path persists (e.g., remains in existence, lasts, etc.) as long as the current of a pulse of the stimulus signal is provided via the ionization path. When the current ceases or is reduced below a threshold (e.g., amperage, voltage), the ionization path collapses (e.g., ceases to exist) and the terminal or electrode is no longer electrically coupled to the target's tissue. Lacking the ionization path, the impedance between the terminal or electrode and target tissue is high. A high voltage in the range of about 50,000 volts can ionize air in a gap of up to about one inch.

A CEW may provide a stimulus signal as a series of current pulses. Each current pulse may include a high voltage portion (e.g., 40,000-100,000 volts) and a low voltage portion (e.g., 500-6,000 volts). The high voltage portion of a pulse of a stimulus signal may ionize air in a gap between an electrode or terminal and a target to electrically couple the electrode or terminal to the target. In response to the electrode or terminal being electrically coupled to the target, the low voltage portion of the pulse delivers an amount of charge into the target's tissue via the ionization path. In response to the electrode or terminal being electrically coupled to the target by contact (e.g., touching, spear embedded into tissue, etc.), the high portion of the pulse and the low portion of the pulse both deliver charge to the target's tissue. Generally, the low voltage portion of the pulse delivers a majority of the charge of the pulse into the target's tissue. In various embodiments, the high voltage portion of a pulse of the stimulus signal may be referred to as the spark or ionization portion. The low voltage portion of a pulse may be referred to as the muscle portion.

In various embodiments, a signal generator of the CEW may provide the stimulus signal (e.g., current, pulses of current, etc.) at only a low voltage (e.g., less than 2,000 volts). The low voltage stimulus signal may not ionize the air in the clothing or the air in the gap that separates the terminal or electrode from the target's tissue. A CEW having a signal generator providing stimulus signals at only a low voltage (e.g., a low voltage signal generator) may require deployed electrodes to be electrically coupled to the target by contact (e.g., touching, spear embedded into tissue, etc.).

A CEW may include at least two terminals at the face of the CEW. A CEW may include two terminals for each bay that accepts a deployment unit (e.g., cartridge). The terminals are spaced apart from each other. In response to the electrodes of the deployment unit in the bay having not been deployed, the high voltage impressed across the terminals will result in ionization of the air between the terminals. The arc between the terminals may be visible to the naked eye. In response to a launched electrode not electrically coupling to a target, the current that would have been provided via the electrodes may arc across the face of the CEW via the terminals.

The likelihood that the stimulus signal will cause NMI increases when the electrodes that deliver the stimulus signal are spaced apart at least 6 inches (15.24 centimeters) so that the current from the stimulus signal flows through the at least 6 inches of the target's tissue. In various embodiments, the electrodes preferably should be spaced apart at least 12 inches (30.48 centimeters) on the target. Because the terminals on a CEW are typically less than 6 inches apart, a stimulus signal delivered through the target's tissue via terminals likely will not cause NMI, only pain.

A series of pulses may include two or more pulses separated in time. Each pulse delivers an amount of charge into the target's tissue. In response to the electrodes being appropriately spaced (as discussed above), the likelihood of inducing NMI increases as each pulse delivers an amount of charge in the range of 55 microcoulombs to 71 microcoulombs per pulse. The likelihood of inducing NMI increases when the rate of pulse delivery (e.g., rate, pulse rate, repetition rate, etc.) is between 11 pulses per second ("pps") and 50 pps. Pulses delivered at a higher rate may provide less charge per pulse to induce NMI. Pulses that deliver more charge per pulse may be delivered at a lesser rate to induce NMI. In various embodiments, a CEW may be hand-held and use batteries to provide the pulses of the stimulus signal. In response to the amount of charge per pulse being high and the pulse rate being high, the CEW may use more energy than is needed to induce NMI. Using more energy than is needed depletes batteries more quickly.

Empirical testing has shown that the power of the battery may be conserved with a high likelihood of causing NMI in response to the pulse rate being less than 44 pps and the charge per a pulse being about 63 microcoulombs. Empirical testing has shown that a pulse rate of 22 pps and 63 microcoulombs per a pulse via a pair of electrodes will induce NMI when the electrode spacing is at least 12 inches (30.48 centimeters).

In various embodiments, a CEW may include a handle and two or more deployment units. The handle may include one or more bays for receiving the deployment units. Each deployment unit may be removably positioned in (e.g., inserted into, coupled to, etc.) a bay. Each deployment unit may releasably electrically, electronically, and/or mechanically couple to a bay. A deployment of the CEW may launch one or more electrodes toward a target to remotely deliver the stimulus signal through the target.

In various embodiments, a deployment unit may include a single electrode. The deployment unit may deploy (e.g., launch) the single electrode individually. Launching the electrode may be referred to as activating (e.g., firing) a deployment unit. After use (e.g., activation, firing), a deployment unit may be removed from the bay and replaced with an unused (e.g., not fired, not activated) deployment unit to permit launch of additional electrodes.

Embodiments according to various aspects of the present disclosure comprise systems, methods, and devices for deploying a plurality of electrodes using a conducted electrical weapon that includes a position sensor. The conducted electrical weapon may include a plurality of deployable electrodes. The conducted electrical weapon may be configured to conduct an electrical stimulus signal through a target via the plurality of electrodes. The position sensor may detect one or more of a spatial location of the conducted electrical weapon, an orientation (e.g., direction) of the weapon, and a targeted location of the conducted electrical weapon.

In various embodiments, the conducted electrical weapon may be configured to automatically deploy an electrode based on a change associated with the conducted electrical weapon. The change may comprise a change in position associated with the conducted electrical weapon. The change in position may include an angle of orientation that exceeds a threshold angle (e.g., angle threshold value). Alternately or additionally, the change in position may include a change in a spatial location (e.g., distance) that exceeds a threshold distance (e.g., distance threshold value). Alternately or additionally, the change in position may include a change in targeted location that exceeds a threshold spacing (e.g., spacing threshold value). In embodiments, the change associated with the conducted electrical weapon may include a change in time after an electrode is deployed from the conducted electrical weapon.

For example, and with reference to FIG. 1, CEW 100 is disclosed. CEW 100 may be similar to, or have similar aspects and/or components with, any conducted electrical weapon discussed herein. CEW 100 may comprise a housing 105 and one or more deployment units 136 (e.g., cartridges). For example, CEW 100 may include a first deployment unit 136-1, a second deployment unit 136-2, and a third deployment unit 136-3. It should be understood by one skilled in the art that FIG. 1 is a schematic representation of CEW 100, and one or more of the components of CEW 100 may be located in any suitable position within, or external to, housing 105. A handle of CEW 100 may comprise housing 105 and one or more of the components of CEW 100 integrated with housing 105. The handle of CEW 100 may be separate from components of CEW 100 that may be selectively coupled to housing 105, such as magazine 134 and deployment units 136.

Housing 105 may be configured to house various components of CEW 100 that are configured to enable deployment of deployment units 136, provide an electrical current to the deployment units 136, and otherwise aid in the operation of CEW 100, as discussed further herein. Although depicted as a firearm in FIG. 1, housing 105 may comprise any suitable shape and/or size. Housing 105 may comprise a handle end 112 opposite a deployment end 114. Deployment end 114 may be configured, and sized and shaped, to receive one or more deployment units 136. Handle end 112 may be sized and shaped to be held in a hand of a user. For example, handle end 112 may be shaped as a handle to enable hand-operation of the CEW by the user. In various embodiments, handle end 112 may also comprise contours shaped to fit the hand of a user, for example, an ergonomic grip. Handle end 112 may include a surface coating, such as, for example, a non-slip surface, a grip pad, a rubber texture, and/or the like. As a further example, handle end 112 may be wrapped in leather, a colored print, and/or any other suitable material, as desired.

In various embodiments, housing 105 may comprise various mechanical, electronic, and/or electrical components configured to aid in performing the functions of CEW 100. For example, housing 105 may comprise one or more control interfaces 140, processing circuits 110, power supplies 160, and/or signal generators 120. Housing 105 may include a guard 145. Guard 145 may define an opening formed in housing 105. Guard 145 may be located on a center region of housing 105 (e.g., as depicted in FIG. 1), and/or in any other suitable location on housing 105. Control interface 140 may be disposed within guard 145. Guard 145 may be configured to protect control interface 140 from unintentional physical contact (e.g., an unintentional activation of a trigger of control interface 140). Guard 145 may surround control interface 140 within housing 105.

In various embodiments, control interface 140 may include a user control interface. A user control interface may be configured to be manually actuated by a user of CEW 100. A user control interface may include a trigger. A user control interface may be coupled to an outer surface of housing 105, and may be configured to move, slide, rotate, or otherwise become physically depressed or moved upon application of physical contact. For example, control interface 140 may be actuated by physical contact applied to control interface 140 from within guard 145. Control interface 140 may comprise a mechanical or electromechanical switch, button, trigger, or the like. For example, control interface 140 may comprise a switch, a pushbutton, and/or any other suitable type of trigger. Control interface 140 may be mechanically and/or electronically coupled to processing circuit 110. In response to control interface 140 being actuated (e.g., depressed, pushed, etc. by the user), processing circuit 110 may enable deployment of one or more deployment units 136 from CEW 100, as discussed further herein.

In various embodiments, power supply 160 may be configured to provide power to various components of CEW 100. For example, power supply 160 may provide energy for operating the electronic and/or electrical components (e.g., parts, subsystems, circuits, etc.) of CEW 100 and/or one or more deployment units 136. Power supply 160 may provide electrical power. Providing electrical power may include providing a current at a voltage. Power supply 160 may be electrically coupled to processing circuit 110 and/or signal generator 120. In various embodiments, in response to control interface 140 comprising electronic properties and/or components, power supply 160 may be electrically coupled to control interface 140. In various embodiments, in response to control interface 140 comprising electronic properties or components, power supply 160 may be electrically coupled to control interface 140. Power supply 160 may provide an electrical current at a voltage. Electrical power from power supply 160 may be provided as a direct current ("DC"). Electrical power from power supply 160 may be provided as an alternating current ("AC"). Power supply 160 may include a battery. The energy of power supply 160 may be renewable or exhaustible, and/or replaceable. For example, power supply 160 may comprise one or more rechargeable or disposable batteries. In various embodiments, the energy from power supply 160 may be converted from one form (e.g., electrical, magnetic, thermal) to another form to perform the functions of a system.

Power supply 160 may provide energy for performing the functions of CEW 100. For example, power supply 160 may provide the electrical current to signal generator 120 that is provided through a target to impede locomotion of the target (e.g., via deployment unit 136). Power supply 160 may provide the energy for a stimulus signal. Power supply 160 may provide the energy for other signals, including an ignition signal and/or an activation signal, as discussed further herein.

In various embodiments, processing circuit 110 may comprise any circuitry, electrical components, electronic components, software, and/or the like configured to perform various operations and functions discussed herein. For example, processing circuit 110 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or any combination thereof. In various embodiments, processing circuit 110 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, processing circuit 110 may include data buses, output ports, input ports, timers, memory, arithmetic units, counters, and/or the like.

Processing circuit 110 may be configured to provide and/or receive electrical signals whether digital and/or analog in form. Processing circuit 110 may provide and/or receive digital information via a data bus using any protocol. Processing circuit 110 may receive information, manipulate the received information, and provide the manipulated information. Processing circuit 110 may store information and retrieve stored information. Information received, stored, and/or manipulated by processing circuit 110 may be used to perform a function, control a function, and/or to perform an operation or execute a stored program. For example, processing circuit 110 may receive position information from position sensor 170 and perform one or more operations based on the position information. Processing circuit 110 may comprise a clock (e.g., clock circuit, circuitry configured to perform operations of a clock, etc.) and perform one or more operations based on a sequence of current times provided via the clock. In embodiments, the clock may comprise one or more of a timer circuit and a counter circuit configured to generate an output signal representing a sequence of current times from which a period or duration of time may be determined by processing circuit 110. The clock may enable an amount of time that has passed since a previous operation was performed (e.g., elapsed time) to be identified by processing circuit 110.

Processing circuit 110 may control the operation and/or function of other circuits and/or components of CEW 100. Processing circuit 110 may receive status information regarding the operation of other components, perform calculations with respect to the status information, and provide commands (e.g., instructions) to one or more other components. Processing circuit 110 may command another component to start operation, continue operation, alter operation, suspend operation, cease operation, or the like. Commands and/or status may be communicated between processing circuit 110 and other circuits and/or components via any type of bus (e.g., SPI bus) including any type of data/address bus.

In various embodiments, processing circuit 110 may be mechanically and/or electronically coupled to control interface 140. Processing circuit 110 may be configured to detect an activation, actuation, depression, input, etc. (collectively, an "activation event") at control interface 140. In response to detecting the actuation event, processing circuit 110 may be configured to perform various operations and/or functions, as discussed further herein. Processing circuit 110 may also include a sensor (e.g., a trigger sensor) attached to control interface 140 and configured to detect an activation event of control interface 140. The sensor may comprise any suitable mechanical and/or electronic sensor capable of detecting an activation event at control interface 140 and reporting the activation event to processing circuit 110.

In various embodiments, processing circuit 110 may be mechanically and/or electronically coupled to control interface 140 to receive an activation signal. The activation signal may include one or more of a mechanical and/or electrical signal. For example, the activation signal may include a mechanical signal received by control interface 140 and detected by processing circuit 110 as an activation event. Alternately or additionally, the activation signal may include an electrical signal received by processing circuit 110 from a sensor associated with control interface 140, wherein the sensor may detect an activation event of control interface 140 and provide the electrical signal to processing circuit 110. In embodiments, control interface 140 may generate an electrical signal in accordance with an activation event of control interface 140 and provide the electrical signal to processing circuit 110 as an activation signal.

In embodiments, processing circuit 110 may receive the activation signal from a different electrical circuit or device. For example, the activation signal may be received via a wireless communication circuit (not shown). The activation signal may be received from a different electrical circuit or device separate from processing circuit 110 and CEW 100. The activation signal may be received from a different electrical circuit or device external and in communication with processing circuit 110 and CEW 100. For example, the activation signal may be received from a remote-control device in wireless communication with CEW 100 and processing circuit 110 of CEW 100.

In various embodiments, control interface 140 may be repeatedly actuated to provide a plurality of activation signals. For example, a trigger may be depressed multiple times to provide a plurality of activation events of the trigger, wherein an activation signal is detected, received, or otherwise determined by processing circuit 110 each time the trigger is depressed. Each activation signal of the plurality of activation signals may be separately received by CEW 100 via control interface 140.

In various embodiments, control interface 140 may be actuated multiple times over a period of time to provide a sequence of activation signals. Each activation signal of the sequence may be received at a different, discrete time during the period of time. For example, a trigger of CEW 100 may be actuated at a first time during a period of time to provide a first activation signal and again actuated at a second time during the period of time to provide a second activation signal. A sequence of activation signals comprising the first activation signal and the second activation signal may be received by CEW 100 via the trigger during the period of time. CEW 100 may receive the sequence of activation signals via control interface 140 and perform at least one function in response to each activation signal of the sequence.

In embodiments, control interface 140 may be actuated for a duration of time to provide an activation signal for the duration of time. The activation signal may be provided to processing circuit 110 during the duration of time. For example, control interface 140 may be actuated (e.g., depressed) to initiate an activation at a first time and the control interface 140 may continue to be actuated during the duration of time until a second time. Processing circuit 110 may detect the activation signal at the first time in accordance with the actuation of control interface 140. Processing circuit 110 may also detect an end to the activation signal at the second time in accordance with the de-actuation (e.g., release) of control interface 140. During the duration of time, processing circuit 110 may continuously receive the activation signal from control interface 140. During the duration of time, processing circuit 110 may periodically detect the activation signal to confirm that the activation signal continues to be provided during the duration of time. During the duration of time, processing circuit 110 may continuously check (e.g., measure, sample, etc.) a signal received via an electrical connection with control interface 140 to confirm that the signal is consistently received during the duration of time. At the second time, processing circuit 110 may detect the activation signal is no longer received via control interface 140. While the activation signal is received via control interface 140, CEW 100 may be configured to perform at least one function in accordance with receiving and continuing to receive the activation signal for the duration of time. When a first activation signal ends (e.g., is terminated, is no longer detected, is no longer received, etc.) the at least one function may end as well. When a second activation signal is received after the first activation signal, another set of one or more operations may be performed in accordance with receiving the second activation for a second duration of time, different from the first activation signal and a first period of time during which the first activation signal was received. In alternate or additional embodiments, CEW 100 may be configured to automatically perform a plurality of operations, including deploying one or more next electrodes, independent of whether an activation signal continues to be received after CEW 100 deploys a first electrode responsive to initially receiving the activation signal.

In various embodiments, CEW 100 may comprise a position sensor (e.g., position detector) configured to detect a position associated with CEW 100. The position sensor may be integrated with CEW 100. The position sensor may be integrated with a handle of CEW 100. For example, CEW 100 may comprise position sensor 170. Position sensor 170 may be configured to detect a position of CEW 100. The position may be detected along an axis, within a plane, and/or in three-dimensional space. Position sensor 170 may include one or more sensors. The one or more sensors may each comprise various types of sensors to detect movement or other properties associated with CEW 100. For example, a sensor (e.g., detector) may include a radar-based sensor, infrared sensor, microwave sensor, gyroscope, ultrasonic detector, acoustic sensor, optical sensor, vibration detector, electromagnetic sensor, accelerometer, inertial measurement units (IMUs). In embodiments according to various aspects of the present disclosure, position sensor 170 may comprise a gyroscope.

In embodiments, position sensor 170 may comprise a distance sensor. The distance sensor may be configured to detect a physical distance between CEW 100 and a location remote from CEW 100 (e.g., remote location). The location remote from CEW 100 may comprise a target location. The distance sensor may be configured to detect a distance between CEW 100 and a targeted location at the target location at a time an electrode is deployed from CEW 100. In embodiments, the distance sensor may comprise an ultrasonic, infrared, LIDAR (Light Detection and Ranging), and/or time-of-flight sensor configured to detect a distance between CEW 100 and a targeted location at a target location. The distance sensor may be configured to emit a signal and, based on a reflectance of the signal from the target location (e.g., reflection of the emitted signal back to position sensor 170 of CEW 100), detect the distance between CEW 100 and the targeted location.

In embodiments, a position of CEW 100 may comprise an orientation of CEW 100. The orientation may be detected (e.g., measured) via position sensor 170. The orientation may comprise a direction (e.g., direction of orientation) in which CEW 100 is oriented (e.g., aimed) at a point in time. The direction may correspond to a direction which one or more electrodes may be deployed from CEW 100. In embodiments, the direction may be determined in one or more planes. For example, the direction may be detected in a vertical plane, perpendicular to a ground plane. In embodiments, the direction may be detected in multiple planes, enabling a three-dimensional orientation of CEW 100 to be determined.

In embodiments, a direction in which CEW 100 is oriented may be detected at different points in time. For example, CEW 100 may be directed in a first direction at a first time and oriented in a second direction at a second time. CEW 100 may be rotated from the first direction to the second direction. The first direction may define an angle of orientation relative to the second direction. A change in position of CEW 100 may comprise the angle of orientation of CEW 100 between the first direction and the second direction.

In embodiments, an angle of orientation may be measured within in at least one plane. For example, an orientation of CEW 100 may be measured in a vertical plane perpendicular to ground level (e.g., a ground plane). Alternately or additionally, the at least one plane may comprise a diagonal plane extending in a parallel or horizontal direction and a vertical or perpendicular direction relative to a ground level and/or a ground plane. In embodiments, the angle may be measured in a plane in which a maximum angle may be defined relative to the reference direction and a current direction in which a CEW (e.g., CEW 100) may be oriented. The angle may comprise a maximum angle between a previous direction in which the CEW is oriented and the current direction in which the CEW is oriented, wherein the maximum angle is disposed in a vertical plane, horizontal plane, lateral plane, or a diagonal plane comprising no more than one of a vertical axis, horizontal axis, or lateral axis.

In embodiments, a position of CEW 100 may comprise a spatial location of CEW 100. The spatial location may be detected (e.g., measured) via position sensor 170. The spatial location may comprise a relative physical location at which CEW 100 is located at a point in time. In embodiments, the spatial location may be determined along one or more axes. For example, the spatial location may be detected along a vertical axis, perpendicular to a ground plane. The spatial location may comprise an elevation of CEW 100. In embodiments, the spatial location may be detected in multiple planes, enabling a three-dimensional spatial location of CEW 100 to be determined.

In embodiments, a spatial location of CEW 100 may be detected at different points in time. For example, CEW 100 may be physically positioned a first spatial location at a first time and physically positioned at a second spatial location at a second time. A difference between the first spatial location and the second spatial location may define a distance of movement of CEW 100. The distance may be defined in a direction between the first spatial location and the second spatial location. The direction may comprise a linear direction between the first spatial location and the second spatial location.

In embodiments, the distance may be measured along one or more axes. For example, the distance may be measured along a vertical axis in which CEW 100 may be moved between the first spatial location and the second spatial location. Three-dimensional movement of CEW 100 between a first spatial location and a second spatial location may comprise a vertical distance along a vertical axis, a horizontal distance along a horizontal axis between CEW 100 and a location of a target, and/or a lateral distance along a lateral axis perpendicular to the horizontal axis. The vertical axis may be defined perpendicular to one or more of ground, ground plane, and a location of a target relative to CEW 100.

In embodiments, position sensor 170 may detect a position of CEW 100 over time. For example, a first position may be detected at a first time and a second position may be detected at a second time. In embodiments, a time in which the position is detected may comprise a time at which an electrode is deployed from CEW 100. In embodiments, a time in which the position is detected may comprise a time after an electrode was previously deployed from CEW 100.

In embodiments, a change in position of CEW 100 may be detected via position sensor 170. Position sensor 170 may detect a first position (e.g., first orientation and/or first spatial location, etc.) of CEW 100 at a first time an electrode is deployed and, at a second time, detect a second position (e.g., second orientation and/or second spatial location, etc.) of CEW 100. Processing circuit 110 may be configured to compare the first position and the second position to determine the change in position of CEW 100. The change in position may comprise a difference between the first position and the second position.

In various embodiments, CEW 100 may comprise an audio output device 180. Audio output device 180 may comprise an audio transducer. In embodiments, audio output device 180 may include a loudspeaker or other type of audio transducer configured to output the one or more audible indicators.

In various embodiments, audio output device 180 may comprise one or more output devices configured to provide one or more audible indicators regarding operation of CEW 100. For example, audio output device 180 may be configured to provide one or more audio indicators (e.g., sounds) while an activation signal is received. The one or more audible indicators may be provided when the activation signal is received. Alternately or additionally, one or more audible indicators may be respectively provided when one or more electrodes are deployed. The audio indicators may include a first audible indicator at one or more first times during reception of an activation signal and a second audible indicator at one or more second times during the reception of the activation signal, wherein the first audible indicator is different from the second audible indicator. For example, the first audible indicator may comprise a first tone of a first length and/or or first frequency and the second audible indicator may comprise a second tone of a second length and/second frequency, respectively different from the first length and the first frequency.

In various embodiments, processing circuit 110 may be electrically and/or electronically coupled to power supply 160. Processing circuit 110 may receive power from power supply 160. The power received from power supply 160 may be used by processing circuit 110 to receive signals, process signals, and transmit signals to various other components in CEW 100. Processing circuit 110 may use power from power supply 160 to detect an activation event of control interface 140 and generate one or more control signals in response to the detected activation event. The control signal may be based on actuation of control interface 140. The control signal may be an electrical signal.

In various embodiments, processing circuit 110 may be electrically and/or electronically coupled to signal generator 120. Processing circuit 110 may be configured to transmit or provide control signals to signal generator 120 in response to detecting an actuation of control interface 140 (e.g., a trigger of control interface 140). Processing circuit 110 may be configured to transmit or provide control signals to signal generator 120 in response to receiving an activation signal. Multiple control signals may be provided from processing circuit 110 to signal generator 120 in series. In response to receiving the control signal, signal generator 120 may be configured to perform various functions and/or operations, as discussed further herein.

In various embodiments, and with reference again to FIG. 1, signal generator 120 may be configured to receive one or more control signals from processing circuit 110. Signal generator 120 may provide an ignition signal to one or more deployment units 136 based on the control signals. Signal generator 120 may provide a stimulus signal to one or more deployment units 136 based on the control signals. Signal generator 120 may be electrically and/or electronically coupled to processing circuit 110 and/or deployment unit 136. Signal generator 120 may be electrically coupled to power supply 160. Signal generator 120 may use power received from power supply 160 to generate an ignition signal. For example, signal generator 120 may receive an electrical signal from power supply 160 that has first current and voltage values. Signal generator 120 may transform the electrical signal into an ignition signal having second current and voltage values. The transformed second current and/or the transformed second voltage values may be different from the first current and/or voltage values. The transformed second current and/or the transformed second voltage values may be the same as the first current and/or voltage values. Signal generator 120 may temporarily store power from power supply 160 and rely on the stored power entirely or in part to provide the ignition signal. Signal generator 120 may also rely on received power from power supply 160 entirely or in part to provide the ignition signal, without needing to temporarily store power. Signal generator 120 may use power received from power supply 160 to generate a stimulus signal. Signal generator 120 may transform an electrical signal provide from power supply 160 to provide the stimulus signal. Each of an ignition signal and a stimulus signal may be provided as an output signal from signal generator 120. In embodiments, the ignition signal and the stimulus signal may be provided responsive to same or different control signals from processing circuit 110.

Signal generator 120 may be controlled entirely or in part by processing circuit 110. In various embodiments, signal generator 120 and processing circuit 110 may be separate components (e.g., physically distinct and/or logically discrete). Signal generator 120 and processing circuit 110 may be a single component. For example, a control circuit within housing 105 may at least include signal generator 120 and processing circuit 110. The control circuit may also include other components and/or arrangements, including those that further integrate corresponding function of these elements into a single component or circuit, as well as those that further separate certain functions into separate components or circuits.

Signal generator 120 may be controlled by the control signals to generate an ignition signal having a predetermined current value or values. For example, signal generator 120 may include a current source. The control signal may be received by signal generator 120 to activate the current source at a current value of the current source. An additional control signal may be received to decrease a current of the current source. For example, signal generator 120 may include a pulse width modification circuit coupled between a current source and an output of the control circuit. A second control signal may be received by signal generator 120 to activate the pulse width modification circuit, thereby decreasing a non-zero period of a signal generated by the current source and an overall current of an ignition signal subsequently output by the control circuit. The pulse width modification circuit may be separate from a circuit of the current source or, alternatively, integrated within a circuit of the current source. Various other forms of signal generators 120 may alternatively or additionally be employed, including those that apply a voltage over one or more different resistances to generate signals with different currents. In various embodiments, signal generator 120 may include a high-voltage module configured to deliver an electrical current having a high voltage. In various embodiments, signal generator 120 may include a low-voltage module configured to deliver an electrical current having a lower voltage, such as, for example, 2,000 volts.

Responsive to receipt of a signal indicating actuation of control interface 140 (e.g., an activation event), a control circuit provides an ignition signal to one or more deployment units 136. For example, signal generator 120 may provide an electrical signal as an ignition signal to first deployment unit 136-1 in response to receiving a control signal from processing circuit 110. In various embodiments, the ignition signal may be separate and distinct from a stimulus signal. For example, a stimulus signal in CEW 100 may be provided to a different circuit within first deployment unit 136-1, relative to a circuit to which an ignition signal is provided. Signal generator 120 may be configured to generate a stimulus signal. In various embodiments, a second, separate signal generator, component, or circuit (not shown) within housing 105 may be configured to generate the stimulus signal. Signal generator 120 may also provide a ground signal path for deployment units 136, thereby completing a circuit for an ignition signal provided to deployment units 136 by signal generator 120. The ground signal path may also be provided to deployment units 136 by other elements in housing 105, including power supply 160.

Signal generator 120 may generate at least two output signals 122. The at least two output signals 122 may include an ignition signal. The at least two output signals 122 may include a stimulus signal. The at least two output signals 122 may include at least two different voltages, wherein each different voltage of the at least two different voltages is determined relative to a common reference voltage. The at least two signals may include first output signal 122-1 and second output signal 122-2. The first output signal 122-1 may have a first voltage. The second output signal 122-2 may have a second voltage. The first voltage may be different from the second voltage relative to a common reference voltage (e.g., ground, the first voltage, the second voltage, etc.). Selector circuit 150 may couple the first output signal 122-1 and the second output signal 122-2 to deployment units 136. Selector circuit 150 may couple the outputs signals 122 via a conductive interface (not shown) between a handle of CEW 100 and deployment units 136. Selector circuit 150 may be configured to selectively couple output signals 122 to deployment units 136 in accordance with one or more control signals received by selector circuit 150 from processing circuit 110. For example, selector circuit 150 may comprise one or more switches that, in response to one or more controls from processing circuit 110, selectively couple one or more output signals 122 to one or more respective deployment units 136. The at least two output signals 122 may be coupled to separate, respective electrical signal paths within CEW 100. The at least two output signals 122 may be provided to a remote location via separate, respective electrical signal paths between CEW 100 and the remote location. Coupling of the at least two electrical signals 122 through a load at the remote location may enable an electrical signal to be delivered at the remote location, wherein the electrical signal comprises a current determined in accordance with at least two different voltages of the at least two output signals 122 and a resistance of the load. For example, a stimulus signal may be provided at a remote location in accordance with a first voltage of first output signal 122-1, a second voltage of second output signal 122-1, and a load at the remote location, wherein an amount of current of the stimulus signal is determined in accordance with a resistance of the load and a voltage difference between the first voltage and the second voltage.

In various embodiments, deployment units 136 may comprise propulsion modules 132 and projectiles. The projectiles may include electrodes 130. Each deployment unit of deployment units 136 may comprise a separate propulsion module and projectile. For example, first deployment unit 136-1 comprises electrode 130-1 and propulsion module 132-1, second deployment unit 136-2 comprises second electrode 130-2 and propulsion module 132-2, and third deployment unit 136-3 comprises third electrode 130-3 and propulsion module 132-3. Providing a signal to an electrode (e.g., providing an ignition signal from a handle of CEW 100 to an electrode of electrodes 130) may comprise providing the signal to the deployment unit in which the electrode is disposed prior to being deployed. The signal may be provided to the electrode via the deployment unit in which the electrode is disposed prior to being deployed. For example, an ignition signal may be provided to an electrode via a propulsion module, which may transform an electrical signal of the ignition signal to a mechanical signal (e.g., force) of the ignition signal, wherein the mechanical signal causes the electrode to be deployed from a deployment unit in which the electrode and the propulsion module are included. As another example, an electrical signal of a stimulus signal may be electrically coupled to an electrode via a housing and/or filament of a deployment unit in which the electrode is included.

In various embodiments, each electrode of electrodes 130 may be configured to provide a single conductive signal path between CEW 100 and a remote location upon deployment. For example, each electrode of the electrodes 130 may comprise a single electrical conductor. Further, each electrode of the electrodes 130 may be coupled to CEW 100 via a respective filament. Each filament may further comprise a single conductor. Accordingly, in various embodiments, each electrode of electrodes 130 may be selectively coupled to one of first output signal 122-1 and second output signal 122-2 at a time. For example, at a given time, first electrode 130-1 may be coupled to either first output signal 122-1 or second output signal 122-2; second electrode 130-2 may be coupled to either first output signal 122-1 or second output signal 122-2; and third electrode 130-3 may be coupled to either first output signal 122-1 or second output signal 122-2. In various embodiments, each electrode of electrodes 130 may either be coupled to a first voltage of first output signal 122-1 or a second voltage of second output signal 122-2 at the given time. In embodiments, at least one electrode of electrodes 130 may be decoupled from signal generator 120. For example, at a given time, first electrode 130-1 may be coupled to one of first output signal 122-1 and second output signal 122-2; second electrode 130-2 may be coupled to another of first output signal 122-1 and second output signal 122-2 different from first electrode 130-1; and third electrode 130-3 may be decoupled from both first output signal 122-1 and second output signal 122-2. As noted above, remote delivery of a current, including a current of a stimulus signal, is determined in accordance with two different voltages provided at a remote location according to various aspects of the present disclosure.

Magazine 134 may be releasably engaged with housing 105. Magazine 134 may include a plurality of firing tubes, where each firing tube is configured to secure one deployment unit of deployment units 136. Magazine 134 may be configured to launch electrodes 130 housed in deployment units 136 installed in each of the plurality of firing tubes of magazine 134. Magazine 134 may be configured to receive any suitable or desired number of deployment units 136, such as, for example, one deployment unit, two deployment units, three deployment units, six deployment units, nine deployment units, ten deployment units, etc.

In various embodiments, propulsion modules 132 may be coupled to, or in communication with respective projectiles in deployment units 136. Propulsion modules 132 may comprise any device, such as propellant (e.g., air, gas, etc.), primer, or the like capable of providing propulsion forces in deployment units 136. The propulsion force may include an increase in pressure caused by rapidly expanding gas within an area or chamber. A propulsion force from each of propulsion modules 132 may be applied to respective projectiles 130 in deployment units 136 to cause the deployment of electrodes 130. Propulsion modules 132 may provide the respective propulsion forces in response to respective deployment units 136 receiving one or more respective ignition signals.

In various embodiments, a propulsion force may be directly applied to a projectile. For example, a first propulsion force may be provided directly to first electrode 130-1 via propulsion module 132-1. Propulsion module 132-1 may be in fluid communication with first electrode 130-1 to provide the propulsion force. For example, the propulsion force from propulsion module 132-1 may travel within a housing or channel of first deployment unit 136-1 to first electrode 130-1. In other embodiments, a propulsion force may be indirectly provided to an electrode. For example, a propulsion module may comprise a piston, wad, or other intermediate component physically disposed between a primer or other propellant, wherein the propulsion force is coupled to the electrode via the intermediate component.

In various embodiments, each projectile of deployment units 136 may comprise any suitable type of projectile. For example, the projectiles may be or include electrodes 130 (e.g., electrode darts). Each electrode of electrodes 130 may include a spear portion, designed to pierce or attach proximate a tissue of a target in order to provide a conductive electrical path between the electrode and tissue. For example, first deployment unit 136-1 may include first electrode 130-1, second deployment unit 136-2 may include second electrode 130-2, and third deployment unit 136-3 may include third electrode 130-3. Electrodes 130 may be deployed from deployment units 136 in series over time. In embodiments, a single electrode (e.g., first electrode 130-1 or second electrode 130-2) launched in response to an ignition signal as further discussed herein.

As noted above, a likelihood of a stimulus signal causing NMI of a target is increased when a spacing between two electrodes through which the stimulus signal is remotely delivered is equal or greater than a minimum spacing of at least six inches. To establish the minimum spacing, two electrodes may be simultaneously deployed from a CEW and a fixed relative angle between the two electrodes. The fixed relative angle may comprise a non-zero angle between a first direction at which a first electrode of the two electrodes is launched from the CEW and a second direction at which a second electrode of the two electrodes is launched from the CEW. In accordance with the fixed relative angle, a spacing between the two electrodes increases as a distance between the two electrodes and the CEW increases. For example, simultaneous launch of two electrodes at a fixed relative angle of 3.5 degrees may enable the minimum distance to be established at a remote location that is a distance of at least nine feet from a CEW. However, a same fixed angle would not enable the minimum spacing to be established for distances of less than eight feet between the CEW and the remote location.

Further, a likelihood of a stimulus signal causing NMI of a target is increased as the spacing between two electrodes through which the stimulus signal is remotely delivered increases. A fixed relative angle at launch between the electrodes may enable a minimum spacing to be obtained for a given distance; however, the fixed relative angle may prevent a spacing greater than the minimum spacing to be established for the given distance. For example, a fixed relative angle may enable a minimum spacing of six inches to be provided at a given distance, but this fixed relative angle may also prevent a greater spacing, such as twelve or fifteen inches from being provided at the given distance, despite such greater spacings having a greater likelihood of causing NMI.

Embodiments according to various aspects of the present disclosure overcome these issues and others. Particularly, embodiments according to various aspects of the present disclosure enable a minimum distance to be established at a remote location by two electrodes without requiring the electrodes to be deployed from a CEW at a fixed relative angle. Various embodiments further enable an electrode to be deployed automatically responsive to a minimum set of input received by the conducted electrical weapon. The set of input may comprise a change detected by the CEW. The change may be detected via a processing circuit of the CEW. In some embodiments, the change may be detected independent of and/or separately from any input received via a control interface of the CEW. The change may be detected via a position sensor of the CEW.

In various embodiments, electrode deployment based on a change in position of a conducted electrical weapon may be provided. For example, in accordance with various embodiments and with reference to FIGS. 2A-2B, an exemplary CEW 200 may be configured to automatically deploy an electrode based on a change in position of the conducted electrical weapon (i.e., CEW 200). The change in position may comprise an angle of orientation of the conducted electrical weapon. CEW 200 may comprise handle 210, a user control interface, and one or more wire-tethered electrodes. CEW 200 may further comprise a position sensor. Handle 210 may be oriented in one or more directions 255 relative to an axis of orientation 220. The wire-tethered electrodes may comprise electrodes 230 coupled to CEW 200 via conductive filaments 232. Activation signal 240 may be received by CEW 200 via the user control interface. The user control interface may include a trigger. In response to activation signal 240 and a change in position of CEW 200, CEW 200 is configured to deploy electrodes 230 toward target location 260. In embodiments, CEW 200 may correspond to various CEWs disclosed herein, including CEW 100 (with brief reference to FIG. 1).

Figure 2A:
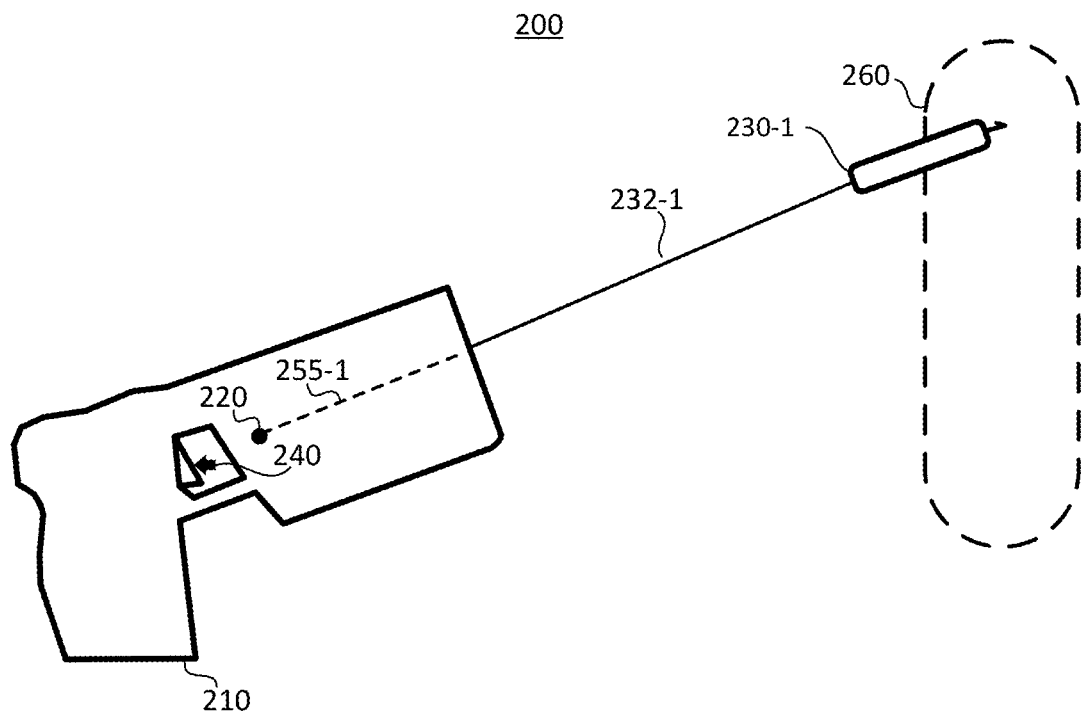
FIGS. 2A-2B illustrate a method of automatically deploying an electrode based on a change in position of the conducted electrical weapon according to various aspects of the disclosure.

At a first time, and with reference to FIG. 2A, activation signal 240 may be received via a trigger of CEW 200. In response to activation signal 240, CEW 200 may deploy a first electrode 230-1. First electrode 230-1 may comprise a single electrode. First electrode 230-1 may be individually deployed from handle 210 of CEW 200 at a given time upon activation signal 240 being received. First electrode 230-1 may be deployed separately in time relative to each other electrode of electrodes 230. First electrode 230-1 may remain conductively coupled to CEW 200 during the deploying of first electrode 230-1 from CEW 200. First electrode 230-1 may be deployed in first direction (e.g., first orientation, first direction of orientation, etc.) 255-1. A position of CEW 200 comprising first direction 255-1 may be detected by a position detector of CEW 200 (e.g., position sensor 170 with brief reference to FIG. 1) at a time first electrode 230-1 is deployed by CEW 200. Information regarding the position at the first time may be stored by CEW 200 for comparison with subsequent positions of CEW 200. First direction 255-1 may be determined relative to axis of orientation 220. In embodiments, axis of orientation 220 may correspond to a physical location of the position sensor of CEW 200. First direction 255-1 may comprise a first direction in which handle 210 is oriented at a time first electrode 230-1 is deployed from CEW 200. Activation signal 240 may continue to be received via the trigger during (e.g., while) and after first electrode 230-1 is deployed from handle 210. Deployment of first electrode 230-1 to target location 260 may provide a partial circuit to target location 260.

After the first time, a change in position may be applied to CEW 200. The change in position may be manually applied to CEW 200. For example, CEW 200 may be rotated about axis of orientation 220 to cause (e.g., create, establish, provide, etc.) the change in position of CEW 200. The change in position may comprise a rotation of CEW 200. In accordance with the change in position, CEW 200 may be swept across target location 260. While CEW 200 is moved after the first point in time, a position of CEW 200 may continue to be detected via one or more position detectors of CEW 200.

Figure 2B:
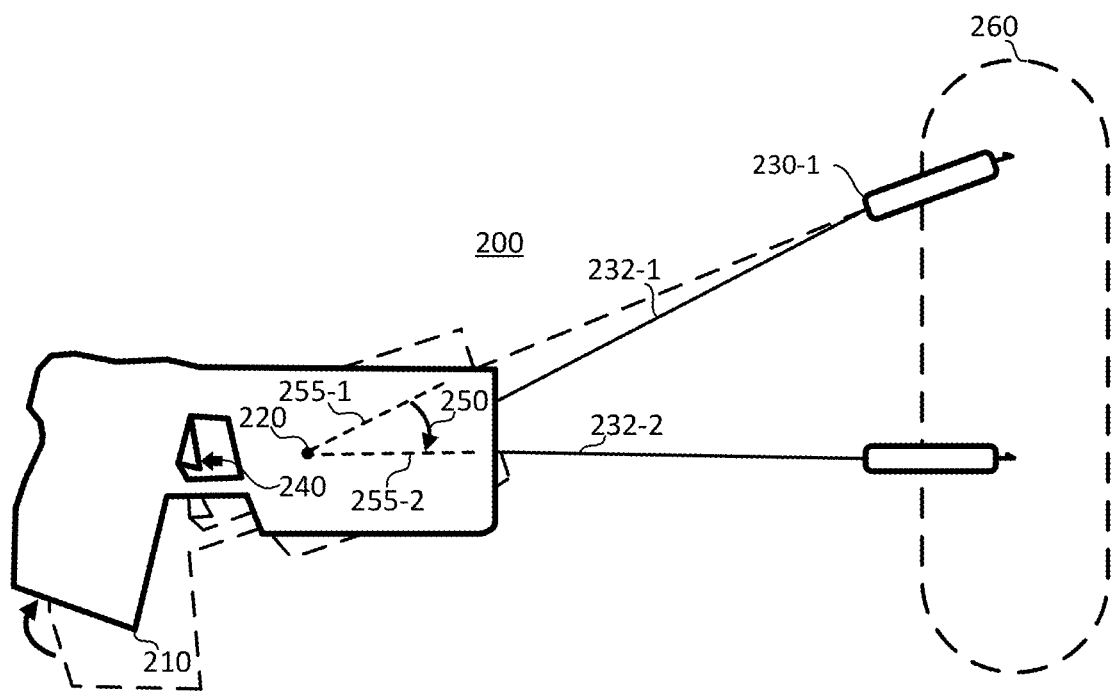

At a second time, and in accordance with the change of position, CEW 200 may automatically deploy another electrode of electrodes 230. For example, and with brief reference to FIG. 2B, CEW 200 may automatically deploy second electrode 230-2 in accordance with a change in position of CEW 200. Second electrode 230-2 may comprise a single electrode. The single electrode may comprise a separate electrode relative to first electrode 230-1. Second electrode 230-2 may be individually deployed from handle 210 of CEW 200 at the second time after the activation signal is received. Second electrode 230-2 may be deployed separately in time relative to each other electrode of electrodes 230. Second electrode 230-2 may remain conductively coupled to CEW 200 via second filament 232-2 while it is deployed from CEW 200. Second electrode 230-2 may be deployed in second direction (e.g., second orientation, second direction of orientation, etc.) 255-2. Second direction 255-2 may be detected by a position detector (e.g., position sensor 170 with brief reference to FIG. 1) at the second time. Second direction 255-2 may be determined relative to axis of orientation 220. Second direction 255-2 may comprise a second direction in which handle 210 is oriented at a time second electrode 230-2 is deployed from CEW 200. Handle 210 may be rotated about axis of orientation 220 between a first position as shown in FIG. 2A and a second position as shown in FIG. 2B. First electrode 230-1 may remain conductively coupled to CEW 200 while CEW 200 is moved to the second position.

In embodiments, activation signal 240 may be continuously received between the first time and the second time. Activation signal 240 may continue to be received via a trigger of CEW 200 between the first time and the second time. In response to activation signal 240 being received continuously, automatic deployment of second electrode 230-2 may be enabled for CEW 200. Unless activation signal 240 continues to be received until the second point in time and/or activation signal 240 is detected at the second time along with the change in position of CEW 200, deployment of second electrode 230-2 may be prevented (e.g., not enabled) in embodiments according to various aspects of the present disclosure.

In embodiments, and based on the change of position being detected by CEW 200, a launch of electrodes 230 toward target location 260 may simplified and expedited. For example, such embodiments may preclude a need for the repeated actuation of a control interface of CEW 200 (e.g., ended and reapplied via a second actuation of a trigger) in order to deploy another electrode. With the maintained activation signal 240, a change in position may be applied to CEW 200 after a first electrode is deployed to cause another electrode to be deployed, thereby simplifying a range of additional inputs that may be otherwise required to be received prior to the other electrode being deployed by CEW 200.

In embodiments, the change in position may comprise an angle of orientation of CEW 200. For example, and with reference to FIG. 2B, angle 250 may be defined between first direction 255-1 and second direction 255-2. Automatically deploying second electrode 230-2 may comprise detecting a change in position comprising angle 250.

In embodiments, angle of orientation 250 may be compared to an angle threshold value. For example, CEW 200 may be configured to deploy one or more electrodes after a position of CEW 200 is changed a minimum angle relative to a direction in which CEW 200 is oriented when a previous electrode is deployed. The previous electrode may include a first electrode deployed in accordance with an activation signal being received (e.g., first electrode 230-1 with brief reference to FIG. 2A). The previous electrode may alternately or additionally comprise a most recently deployed electrode in an array of electrodes deployed sequentially from CEW 200. Detecting the change in position may comprise determining an angle between orientations of handle 210 and comparing the angle to the angle threshold value. When the change in position is less than the threshold angle value, CEW 200 may not automatically deploy another electrode. When the change in position is less than the angle threshold value, CEW 200 may repeat detection of a current position (e.g., current direction) of CEW 200. The detection may be repeated until CEW is rotated to an angle of orientation (e.g., angle of orientation 250) greater than the angle threshold value. When the change in position is equal or greater than the threshold angle value, CEW 200 may automatically deploy another electrode in order to provide a complete circuit to target location via a first electrode and the other electrode.

In various embodiments, a threshold angle value may comprise a predetermined angle. The predetermined angle may be selected to establish a minimum spacing between deployed electrodes at a predetermined distance. For example, the threshold angle value may comprise an angle of 3.5 degrees, 5 degrees, or 12 degrees. Alternately or additionally, the threshold angle value may comprise an angle of at least 3.5 degrees, at least 5 degrees, or at least 12 degrees according to various aspects of the present disclosure. Alternately or additionally, the threshold angle value may comprise an angle of less than 3.5 degrees, less than 5 degrees, or less than 12 degrees. By setting such predetermined angle threshold value, a minimum spacing between electrodes in a series of deployed electrodes may be established and placement of two electrodes from a plurality of electrodes in close proximity to each other at a target location may be avoided. Further, electrodes may still be selectively deployed from a CEW in a controlled manner. By enabling an angle threshold value to be established by a processing circuit of CEW 200 (e.g., processing circuit 110 with brief reference to FIG. 1) relative angles between deployed electrodes may be adjustable. The relative angles may not be limited by a fixed angle of a deployment unit configured to deploy two electrodes at the fixed angle at a same time.

In various embodiments, a change in position of a CEW may comprise an alternate or additional motion of the CEW. The additional motion may comprise another physical movement of the CEW, different from rotation of the CEW. The additional motion may comprise translation (e.g., physical transfer) of the CEW. The change in position may comprise a movement of the CEW along one or more axes of motion. For example, in accordance with various embodiments and with reference to FIG. 3, an exemplary CEW 300 may be configured to detect a change in position comprising a change in spatial location of the conducted electrical weapon. CEW 300 may comprise a handle 310 and one or more wire-tethered electrodes. Handle 310 may be physically positioned in one or more spatial locations 320. The wire-tethered electrodes may comprise electrodes 330 coupled to CEW 300 via conductive filaments 332. An activation signal 340 may be received by CEW 300 via a user control interface of CEW 300. In response to activation signal 340 and a change in position of CEW 300, CEW 300 may be configured to deploy electrodes 330 toward target location 360. In embodiments, CEW 300 may correspond to one or more CEWs disclosed herein, including CEW 100 and/or CEW 200 (with brief reference to FIGS. 1 and 2A-2B).

Figure 3:
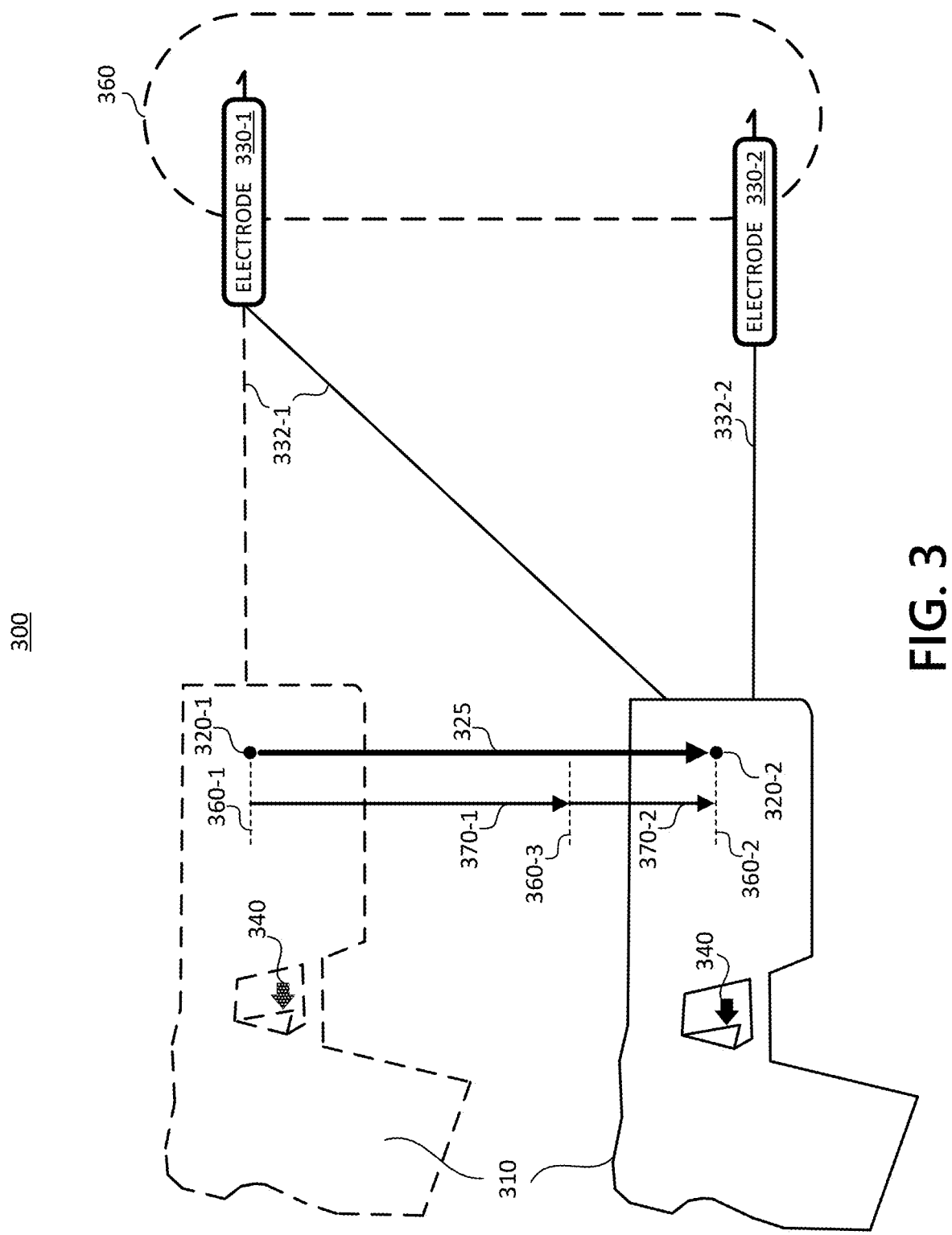
FIG. 3 illustrates a method of automatically deploying an electrode based on a change in position according to various aspects of the disclosure.

At a first time, and with reference to FIG. 3, an activation signal 340 may be received by CEW 300. Activation signal 340 may be received via a user control interface (e.g., a trigger) of CEW 300. In response to activation signal 340, CEW 300 may be configured to deploy first electrode 330-1. First electrode 330-1 may comprise a single electrode. First electrode 330-1 may be individually deployed from handle 310 of CEW 300 at a time activation signal 340 is received. In embodiments, first electrode 330-1 may be deployed at a start time of a duration of time at which activation signal 340 is received. First electrode 330-1 may be deployed separately in time relative to each other electrode of electrodes 330. First electrode 330-1 may remain conductively coupled to CEW 300 via first filament 332-1 while first electrode 330-1 is deployed from CEW 300.

At the first time, activation signal 340 may be received while CEW 300 is positioned at first spatial location 320-1. First spatial location 320-1 may be determined relative to a reference location on handle 310 of CEW 300. For example, each spatial location 320 including first spatial location 320-1 may be detected at a physical location of one or more position detectors located within handle 310 of CEW 300. A position of CEW 300 comprising first spatial location 320-1 may be detected by a position detector (e.g., position sensor 170 with brief reference to FIG. 1) at a time first electrode 330-1 is deployed from CEW 300. Information regarding the position at the first time may be stored by CEW 300 for comparison with one or more subsequent positions of CEW 300.

In embodiments, first spatial location 320-1 may be determined relative to an elevation of CEW 300. The elevation may comprise first elevation 360-1 at a time first electrode 330-1 is deployed from CEW 300. Activation signal 340 may continue to be received during and after first electrode 330-1 is deployed from handle 310. Deployment of first electrode 330-1 to target location 360 may provide a partial circuit to target location 360.

After the first time, a change in position may be applied to CEW 300. The change in position may be manually applied to CEW 300. For example, an elevation of CEW 300 may be changed relative to target location 360. In other example embodiments, a lateral position of CEW 300 may be changed, in addition or alternately to an elevation of CEW 300. In accordance with the change in position, CEW 300 may be swept across (e.g., along, parallel to, etc.) target location 360. While CEW 300 is moved after the first time, a position of CEW 300 may continue to be detected via one or more position detectors of CEW 300.

At a second time, and in accordance with the change of position, CEW 300 may automatically deploy another electrode of electrodes 330. For example, CEW 300 may automatically deploy second electrode 330-2 in accordance with the change in position of CEW 300. Second electrode 330-2 may comprise a single electrode. The single electrode may comprise a separate electrode relative to first electrode 330-1. Second electrode 330-2 may be individually deployed from handle 310 of CEW 300 at the second time after activation signal 340 is received. Second electrode 330-2 may be deployed separately in time relative to each other electrode of electrodes 330. Second electrode 330-2 may remain conductively coupled to CEW 300 via second filament 332-2 while it is deployed from CEW 300. First electrode 330-1 may remain conductively coupled to CEW 300 via first filament 332-1 between the first time and the second time when second electrode 330-2 is deployed from CEW 300. Second electrode 330-2 may be deployed at a second spatial location 320-2. Second spatial location 320-2 may be detected by at least one position detector (e.g., position sensor 170 with brief reference to FIG. 1) of CEW 300 at the second time. Second spatial location 320-2 may be determined relative to a position along one or more axes of motion for CEW 300. For example, second spatial location 320-2 may comprise a second elevation 360-2 of CEW 300, different from first elevation 360-1. Second spatial location 320-2 may comprise a second position at which handle 310 is physically positioned at a time second electrode 330-1 is deployed from CEW 300. Handle 310 may move between first spatial location 320-1 and second spatial location 320-2 as shown in FIG. 3. First electrode 330-1 may remain conductively coupled to CEW 300 while CEW 300 is moved to a second position.

In embodiments, activation signal 340 may be continuously received between the first time and the second time. Activation signal 340 may continue to be received via a same user control interface (e.g., a trigger) of CEW 300 between the first time and the second time. In response to activation signal 340 being received continuously, automatic deployment of second electrode 330-2 may be enabled for CEW 300. Unless activation signal 340 continues to be received at each time between the first time and second time and/or activation signal 340 is detected at each spatial location 320 of CEW 300 between first spatial location 320-1 and second spatial location 320-2, deployment of second electrode 330-2 may be prevented (e.g., not enabled) in embodiments according to various aspects of the present disclosure.

In embodiments, and based on the change of position being detected by CEW 300, a launch of electrodes 330 toward target location 360 may simplified and expedited. For example, such embodiments may preclude a need for the repeated actuation of a user control interface of CEW 300 to be disengaged and then re-engaged in order to deploy another electrode. Because activation signal is maintained, a change in position may be used to decrease the amount and complexity of inputs that may otherwise be necessary to deploy a second electrode toward a target location. The second electrode may be deployed without further input being received via a given user control interface, enabling an orientation of a CEW to remain a sole focus and sole input necessary to continue deploying electrodes toward a target location.

In embodiments, the change in position may comprise a distance of movement of CEW 300. For example, and with reference to FIG. 3, distance 325 may be defined between first spatial location 320-1 and second spatial location 320-2. Distance 325 may comprise a vertical distance between first elevation 360-1 and second elevation 360-2. In other embodiments, distance 325 may comprise a vertical distance, a lateral distance, a depth distance perpendicular to a vertical axis and a lateral axis, or a combination of vertical distance, lateral distance, and/or depth distance by which a diagonal distance between first spatial location 320-1 and second spatial location 320-2 is provided. Automatically deploying second electrode 330-2 may comprise detecting a change in position comprising distance 325.

In embodiments, distance 325 may be compared to a distance threshold value. For example, CEW 300 may be configured to deploy one or more electrodes after a position of CEW 300 is changed a minimum distance relative to a spatial location at which CEW 200 is located when a previous electrode is deployed. The previous electrode may include a first electrode deployed in accordance with activation signal 340 being received (e.g., first electrode 330-1). The previous electrode may alternately or additionally comprise a most recently deployed electrode in an array of electrodes deployed sequentially from CEW 300. For example, the previous electrode may comprise a second electrode in an array of three or more electrodes. Detecting the change in position may comprise determining a distance (e.g., distance 325) between locations 320 of handle 310 and comparing the distance to the distance threshold value. When the change in position is less than the distance threshold value, CEW 300 may not automatically deploy another electrode. For example, a change in position comprising second distance 370-1 between first elevation 360-1 and third elevation 360-3 may be less than a distance threshold value. Second distance 370-1 may be less than the distance threshold value and, as such, be insufficient to cause another electrode to be deployed. When the change in position is less than the distance threshold value, CEW 200 may repeat detection of a current position (e.g., current spatial position) of CEW 200. The detection may be repeated until CEW is translated a distance (e.g., distance 325) greater than the distance threshold value. When the change in position is equal or greater than the threshold value, CEW 300 may automatically deploy another electrode in order to provide a complete circuit to target location via a first electrode and the other electrode. For example, if handle 310 is further moved third distance 370-2 from third elevation 360-3 to second elevation 360-2, second distance 370-1 and third distance 370-2 may be equal or greater than a distance threshold value and thus, upon detection, be sufficient to cause another electrode to be deployed from CEW 300. In embodiments, second distance 370-1 and third distance 370-2 may be equal or greater than distance 325. In embodiments, distance 325 may comprise a linear distance between first spatial location 320-1 and second spatial location 320-2. Distance 325 may comprise a linear distance in a plane perpendicular to a direction between CEW 300 and target location 360.

In various embodiments, a distance threshold value may comprise a predetermined distance. The predetermined distance may be selected to establish a minimum spacing between deployed electrodes for a constant orientation of a CEW. For example, the distance threshold value may comprise a distance of five inches, seven inches, or nine inches. Alternately or additionally, the threshold value may comprise a distance of at least five inches, at least seven inches, or at least nine inches according to various aspects of the present disclosure. By setting such predetermined distance threshold value, a minimum spacing between electrodes in a series of deployed electrodes may be established and placement of two electrodes from a plurality of electrodes in close proximity to each other at a target location may be avoided. With such an arrangement, automatic deployment of electrodes may be provided in a selective and controlled manner.

In various embodiments, a change in position of a CEW may comprise an alternate or additional motion of the CEW. The additional motion may comprise a relative physical position of the CEW. The additional motion may comprise a motion of the CEW relative to a target and/or target location. The additional motion may comprise a rotation of the CEW and/or a vertical translation and/or a lateral translation of the CEW. The additional motion may further comprise motion in a direction between the target location and the CEW (e.g., depth translation of the CEW). The additional motion may comprise movement of the target (i.e., movement of target location) as detected by the CEW. The additional motion may be determined relative to the target and/or target location. The additional motion may be determined in accordance with a distance between the CEW and the target and/or target location. Detecting the change in position may further comprise detecting a distance between the CEW and the target location and/or target.

In various embodiments, detecting a change in position of a CEW may comprise detecting a change in targeted location of the CEW. For example, in accordance with various embodiments and with reference to FIG. 4, an exemplary CEW 400 may comprise a handle 410 and one or more wire-tethered electrodes. CEW 400 may be configured to automatically deploy an electrode based on a change in position comprising a change in targeted location detected by CEW 400. Handle 410 may be physically positioned in one or more positions 420. Each position of positions 420 may comprise a physical position of CEW 400, such an orientation 440 (e.g., one or more directions) or a spatial position of CEW 400. Alternately or additionally, each position of positions 420 may comprise a relative physical position between CEW 400 and target location 460. The wire-tethered electrodes may comprise electrodes 430 coupled to CEW 400 via conductive filaments 432. CEW 400 may be oriented toward target location 460 to deploy electrodes 430 toward targeted locations 425 at target location 460. In response to a change in targeted location of CEW 400, CEW 400 may be configured to automatically deploy at least one next electrode of electrodes 430 toward target location 460. In embodiments, the change in targeted location may be determined based on a change in position of CEW 400 and/or a change in position of target location 460. In embodiments, CEW 400 may correspond to one or more CEWs disclosed herein, including CEW 100 and/or CEW 200 and/or CEW 300 with brief reference to FIGS. 1-3.

Figure 4:
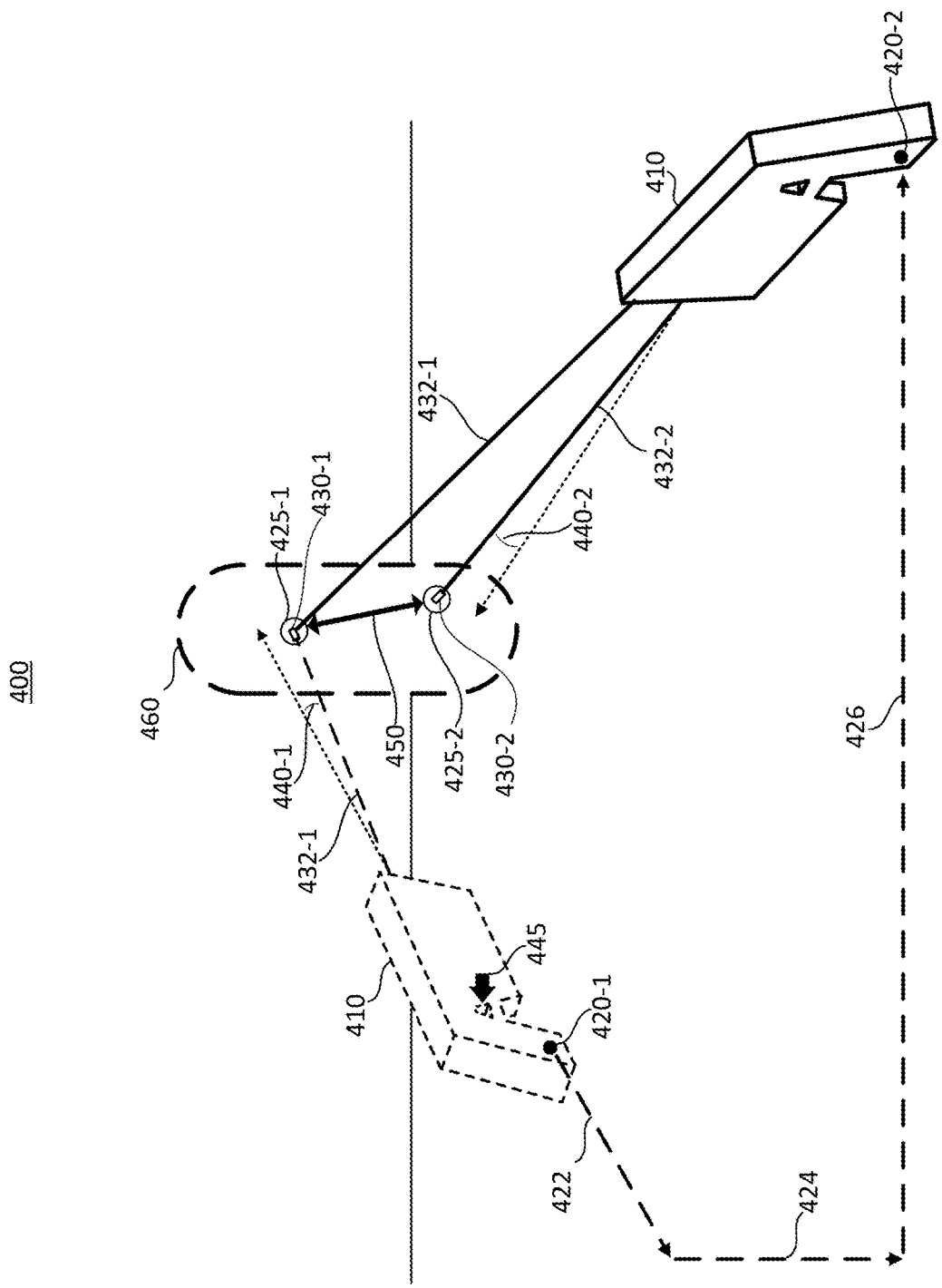
FIG. 4 illustrates a method of automatically deploying an electrode based on a change in position according to various aspects of the disclosure.

At a first time, and with reference to FIG. 4, an activation signal 445 may be received by CEW 400. Activation signal 445 may be received via a user control interface (e.g., a trigger) of CEW 400. In response to activation signal 445, CEW 400 may be configured to deploy first electrode 430-1. First electrode 430-1 may comprise a single electrode. First electrode 430-1 may be individually deployed from handle 410 of CEW 400 at a time activation signal 445 is received. In embodiments, first electrode 330-1 may be deployed at a start time of a duration of time at which activation signal 445 is received. First electrode 430-1 may be deployed separately in time relative to each other electrode of electrodes 430. First electrode 430-1 may remain conductively coupled to CEW 400 via first filament 432-1 while first electrode 430-1 is deployed from CEW 400.

At the first time, CEW 400 may be positioned at first position 420-1. First position 420-1 may be determined relative to a reference location on handle 410 of CEW 400. For example, each position 420 including first position 420-1 may be detected at a physical location of one or more position sensors located within handle 410 of CEW 400. A position of CEW 400 comprising first position 420-1 may be detected by a position sensor (e.g., position sensor 170 with brief reference to FIG. 1) at a time first electrode 430-1 is deployed from CEW 400. Information regarding first position 420-1 at the first time may be stored by CEW 400 for comparison with one or more subsequent positions of CEW 400.

At the first time, CEW 400 may be oriented toward at first targeted location 425-1. First targeted location 425-1 may comprise a location at target location 460 to which the first electrode 430-1 is deployed upon first electrode 430-1 being launched from CEW 400 First targeted location 425-1 may comprise an impact location of first electrode 430-1 at target location 460. First targeted location 425-1 may comprise a portion of a physical surface of a target positioned at target location 460. Prior to first electrode 430-1 being deployed, first targeted location 425-1 may be visually indicated by CEW 400. For example, CEW 400 may comprise a laser sight configured to illuminate first targeted location 425-1 at target location 460 prior to CEW deploying first electrode 430-1.

In embodiments, detecting a first position 420-1 may comprise detecting first targeted location 425-1. First targeted location 425-1 may be detected via a position sensor of CEW 400. For example, CEW 400 may comprise a position sensor (e.g., position sensor 170 with brief reference to FIG. 1) that includes a distance sensor. The distance sensor may be configured to detect a physical distance between CEW 400 and a remote location. The distance sensor may be configured to detect a distance between CEW and targeted location 425-1 at target location 460 at a first time of first electrode 430-1 being deployed from CEW 400. In embodiments, the distance sensor may comprise an ultrasonic, infrared, LIDAR (Light Detection and Ranging), and/or time-of-flight sensor configured to detect a distance between CEW 400 and targeted location 425-1 at target location 460. The distance sensor may be configured to emit a signal and, based on a reflectance of the signal from target location 460 (e.g., reflection of the emitted signal back to the position sensor of CEW 400), detect the distance between CEW 400 and target location 460. Alternately, or additionally, the distance sensor may detect the distance in accordance with one or more properties of at least one electrode of electrodes 430. For example, a timing of and/or voltage by which an electrode (e.g., first electrode 430-1) conducts an electrical signal through a target a target location 460 may be used to determine a distance between CEW 400 and target location 460. Determining the distance may further include determining an initial time of deployment of the electrode and/or an initial time of an applied voltage of the electrical signal in order to determine a time of flight of the electrode and, as such, a distance between the electrode and target location 460. The initial time of the applied voltage may indicate when the electrode is coupled to a target. The timing at which the electrode is coupled to the target, along with the timing at which the electrode was deployed, may indicate a time of flight of the electrode. The distance may be further calculated in accordance with the time of flight and a predetermined velocity at which the electrode is deployed from a CEW. This distance, as measured in accordance with an electrical signal conducted through the target by one more electrodes, may be subsequently used to calculate a spacing at the target location between a last deployed electrode and a next electrode prior to automatically deploying the next electrode toward the target location. Information regarding first targeted location 425-1 may be stored by CEW 400 for subsequent processing.

In embodiments, detecting a first position 420-1 may comprise detecting first targeted location 425-1 in three-dimensional space. First targeted location 425-1 may be detected in three-dimensional space via a position sensor of CEW 400. The position sensor may comprise a distance sensor as discussed above. The position sensor may further comprise an orientation sensor and/or movement sensor configured to detect a three-dimensional position of CEW 400. For example, the position sensor may comprise a gyroscope as discussed with respect to CEW 200 with brief reference to FIGS. 2A-2B. The position sensor may be configured to detect a spatial location and/or orientation associated with first position 420-1 of CEW 400. The spatial location may comprise one or more of an elevation and a lateral position (e.g., position along a lateral axis) of CEW 400. The spatial location may further comprise a depth position defined along an axis perpendicular to a vertical axis and lateral axis by which the elevation and lateral position are respectively defined. The orientation of CEW 400 may comprise a direction of orientation of CEW 400 in one or more spatial planes. In accordance with information detected by the position sensor, first position 420-1 of CEW 400 may be determined. Relative to first position 420-1, first targeted location 425-1 may be detected. For example, first targeted location 425-1 may be detected in accordance with a position of CEW 400 in further combination with a distance between CEW 400 and target location 460 as detected by a distance sensor of CEW 400.

After the first time, a change in position may be applied to CEW 400. The change in position may be manually applied to CEW 400. CEW 400 may be repositioned from first position 420-1 to second position 420-2. One or more of an elevation of CEW 400, lateral position perpendicular to target location 460, and/or distance between CEW 400 and target location 460 may be modified (adjusted, increased, decreased, etc.) after the first time. Alternately or additionally, an orientation of CEW 400 may be modified between the first time and a second time. For example, as illustrated in FIG. 4, handle 410 may be moved in a horizontal direction 422 away from target location 460 to increase a distance between handle 410 and target location. Handle 410 may be further moved in downward direction 424 to decrease an elevation of CEW 400. Handle 410 may be further changed in position in a lateral direction 426 to change a lateral position of handle 410. A difference in spatial position of first position 420-1 and second position 420-2 may be determined in accordance with a distance of movement of CEW in each of horizontal direction 422, downward direction 424, and lateral direction 426. Handle 410 may remain generally oriented toward target location 460, though a relative orientation of CEW 400 toward target location 460 may change. For example, first position 420-1 of CEW 400 may comprise first orientation 440-1 (e.g., first direction in each of one or more spatial planes). For purposes of illustration, a reference direction between CEW 400 and a centerline of target location 460 is illustrated as a dotted line in FIG. 4, while a direction of CEW 400 is illustrated as a dashed line in FIG. 4. The reference direction may be disposed in a horizontal plane in which CEW 400 and target location 460 are both disposed. First orientation 440-1 may comprise one or more angles between the reference direction. First orientation 440 may comprise one or more directions of orientation of CEW in respective spatial planes perpendicular to the reference direction. After the change in position is applied to CEW 400, second position 420-2 may comprise second orientation 440-2 (e.g., second direction in each of one or more spatial planes) of CEW 400. A difference in position between first orientation 440-1 and second orientation 440 may comprise an angle between a direction of first orientation 440-1 and a direction of second orientation 440-2 in each of one or more spatial planes. Between first position 420-1 and second position 420-2, CEW 400 may remain oriented toward target location 460. In some embodiments, a difference in position between first position 420-1 and second position 420-2 may be determined in accordance with a change in targeted location 425 at remote location. After the first time, a change in position of CEW 400, including a change in relative position between CEW and a target location may be continuously be detected.

At a second time, and in accordance with the change of position, CEW 400 may automatically deploy a next electrode of electrodes 430. For example, CEW 400 may automatically deploy second electrode 430-2 in accordance with the change in position of CEW 400. Second electrode 430-2 may comprise a single electrode. The single electrode may comprise a separate electrode relative to first electrode 430-1. Second electrode 430-2 may be individually deployed from handle 410 of CEW 400 at the second time after activation signal 445 is received. Second electrode 430-2 may remain conductively coupled to CEW 400 via second filament 432-2 while it is deployed from CEW 400. First electrode 430-1 may remain conductively coupled to CEW 400 via first filament 432-1 between the first time and the second time when second electrode 430-2 is deployed from CEW 400. First electrode 430-1 may remain conductively coupled to CEW 400 while CEW 400 is moved to a second position.

In embodiments, second electrode 430-2 may be deployed at second position 420-2. Second position 420-2 may be detected by at least one position detector (e.g., position sensor 170 with brief reference to FIG. 1) of CEW 400 at the second time. Second position 420-2 may comprise a spatial location (e.g., second spatial location) determined along one or more axes of motion for CEW 400. For example, second position 420-2 may comprise a second elevation of CEW 400 in accordance with a change in position of CEW 400 along vertical direction 424, a second lateral position in accordance with a change in position along lateral direction 426, and a different distance from target location 460 in accordance with a change in position along depth direction 422. Second position 420-2 may comprise at least one second direction to which handle 410 is oriented at a time second electrode 430-1 is deployed from CEW 400. Second position 420-2 may comprise an orientation of CEW 400. For example, second position 420-2 may include second orientation 440-2 relative to target location 460, different from first orientation 440-1. Second position 420-2 may comprise a second spatial position at which handle 410 is physically located at a time second electrode 430-1 is deployed from CEW 400. Handle 410 may move between first position 420-1 and second position 420-2 as shown in FIG. 4. Automatically deploying second electrode 430-2 may comprise detecting second position 420-2 and, in accordance with second position 420-2, deploying second electrode.

In embodiments, detecting second position 420-2 may comprise detecting second targeted location 425-2. Second targeted location 425-2 may comprise a second physical location at target location 460. Second targeted location 425-2 may comprise another portion of a physical surface of a target positioned at target location 460. Second targeted location 425-2 may comprise a different location at target location 460. After first electrode 430-1 is deployed, second targeted location 425-2 may be visually indicated by CEW 400. For example, CEW 400 may comprise a laser sight configured to illuminate second targeted location 425-2 at target location 460 after CEW deployed first electrode 430-1. The laser sight may comprise a same laser sight employed to illuminate first targeted location 425-1.

In embodiments, detecting second position 420-2 may comprise detecting second targeted location 425-2 via a position sensor of CEW 400. Second targeted location 425-2 may be detected via a same position sensor by which first targeted location 425-1 is detected. Detecting second position 420-2 may comprise detecting a distance between CEW 400 and target location 460. For example, a second distance of CEW 400 from target location 460 at the second time may be detected via the position sensor of CEW 400. The second distance may be different from a first distance between CEW 400 and first targeted location 425-1 at target location 460 at the first time first electrode 430-1 is deployed from CEW 400. Detecting second position 420-2 may comprise detecting an orientation of CEW 400 relative to target location 460. For example, a second angle of orientation 440-2 of CEW 400 at the second time may be detected via the position sensor of CEW 400. The second angle of orientation 440-2 may be different from first angle of orientation 440-1 of CEW 400 at a first time first electrode 430-1 was deployed from CEW 400. Detecting second position 420-2 may comprise detecting a relative spatial location CEW 400 relative to target location 460. For example, a second spatial location of CEW 400 at the second time may be detected via the position sensor of CEW 400. The second spatial location may be different from first spatial location of orientation 440-1 of CEW 400 at a first time first electrode 430-1 was deployed from CEW 400. The second spatial location may comprise a vertical location (e.g., elevation) of CEW 400 and a lateral position.

In embodiments, targeted locations 425 may comprise relative locations. The relative locations may be determined relative to a location of CEW 400. The relative locations may be determined as different in spatial position along three or more axis. For example, a spatial location of first targeted location 425-1 may comprise a difference in distance, elevation, and/or lateral position perpendicular to the distance and elevation relative to a spatial location of first position 420-1. A spatial location of second targeted location 425-2 may comprise a difference in distance, elevation, and/or lateral position perpendicular to the distance and elevation relative to a spatial location of second position 420-2.

In embodiments, the relative locations associated with targeted locations 425 may be determined at target location 460. For example, the relative locations may be determined relative to a reference plane at target location 460 at a distance away from first position 420-1. The distance may comprise a predetermined distance. For example, the distance may comprise a predetermined distance of fifteen, twenty, or twenty-five feet. Alternately or additionally, the distance may comprise a detected distance between first position 420-1 and target location 460 as detected by a position sensor of CEW 400. In other embodiments, a distance detected at a time an electrode is deployed may be used as a default distance at which the target location is located in order to calculate a targeted location for a next electrode to be deployed. A distance between a CEW and a targeted location used for detecting a next targeted location may comprise a previously measured distance as further modified (e.g., increased or decreased) in accordance with a change in spatial location along a depth direction as detected by a position sensor of the CEW. Each of the targeted locations may be determined in accordance with a position of CEW 400. For example, a targeted location may comprise a spatial location in three-dimensional space determined at a distance away from a spatial location of CEW 400 in a direction in which CEW 400 is oriented.

In embodiments, detecting second position 420-2 may comprise detecting a change in targeted location. The change in targeted location may comprise a spacing at target location 460. For example, and with reference to FIG. 4, spacing 450 may be defined between first targeted location 425-1 and second targeted location 425-2. Spacing 450 may comprise a measurable physical separation between two locations remote from CEW 400. Spacing 450 may be detected at CEW 400. Spacing 450 may be detected at a remote location from target location 460. For example, CEW 400 may detect spacing at a spatial location remote (spaced away, distant to, etc.) from remote location 460. Spacing 450 may comprise a distance. The distance may correspond to a distance along target location 460 and/or a target located at target location 460. The distance may be different from a distance between CEW 400 and remote location 460. Spacing 450 may comprise a distance along one or more axes. For example, spacing 450 may comprise a distance determined in a vertical direction parallel to vertical direction 424. Alternately or additionally, spacing 450 may comprise a one or more of a vertical distance, a distance in three-dimensional space, and a distance within a reference plane at target location.

In embodiments, detecting a change in targeted location may comprise comparing a reference position to a current position. The reference position may be compared to the current position to determine a distance. The reference position may comprise a previous current position at which an electrode was deployed from a conducted electrical weapon. The current position may comprise a position of the conducted electrical weapon at a second time after the electrode associated with the reference position was deployed and prior to deploying a next electrode from the conducted electrical weapon. For example, detecting the change in targeted locations 425 for CEW 400 may comprise comparing a first position 420-1 to second position 420-2 to detect a change in position comprising spacing 450. Comparing first position 420-1 to second position 420-2 may include comparing first targeted location 425-1 to second targeted location 425-2. For example, first targeted location 425-1 may comprise a first spatial location in three-dimensional space and second targeted location 425-2 may comprise a second spatial location in three-dimensional space. First targeted location 425-1 and second targeted location 425-2 may comprise respective spatial locations at target location, remote from CEW 400. Spacing 450 may comprise a difference between the first spatial location and the second spatial location in one or more planes. Detecting the change in targeted location may comprise detecting spacing 450 in the one or more reference planes.

In embodiments, a change in position of CEW 400 may comprise a change in targeted location. The change in targeted location may comprise a distance at target location 460. For example, and with reference to FIG. 4, spacing 450 may be defined between first targeted location 425-1 and second targeted location 425-2. Spacing 450 may comprise a distance along one or more axes. For example, spacing 450 may comprise a distance in vertical direction parallel to vertical direction 424. Alternately or additionally, spacing 450 may comprise a one or more of a vertical distance and a distance in three-dimensional space. Automatically deploying second electrode 430-2 may comprise detecting a change in targeted location comprising spacing 450.

In embodiments, spacing 450 may be compared to a threshold value. The threshold value may comprise a spacing threshold value. The threshold value may comprise a predetermined value associated with a likelihood of causing NMI at target location 460. For example, the threshold value may comprise at least five inches, at least six inches, at least seven inches, at least nine inches, or at least twelve inches. After a previous electrode is deployed, CEW 400 may be configured to deploy one or more electrodes after a position of CEW 400 is changed in an amount sufficient to establish a change in targeted location equal or greater than the threshold value. The previous electrode may include a first electrode deployed in accordance with activation signal 445 being received (e.g., first electrode 430-1). The previous electrode may alternately or additionally comprise a most recently deployed electrode in an array of electrodes deployed sequentially from CEW 400. For example, the previous electrode may comprise a second electrode in an array of three or more electrodes. Detecting a change in position may comprise detecting a change in targeted location. Detecting the change in targeted location may comprise determining a distance (e.g., spacing 450) between targeted locations 425 associated with handle 410 and comparing the distance to the spacing threshold value. When the change in position comprises a change in targeted location less than the threshold value, CEW 400 may not automatically deploy another electrode. For example, a change in targeted location between first targeted location 425-1 and second targeted location 425-2 less than a predetermined threshold value may be insufficient to cause another electrode to be deployed. When the change in position is less than the spacing threshold value, CEW 400 may repeat detection of a position (e.g., current targeted location) of CEW 400. The detection may comprise repeated detection of a distance between CEW 400 and target location 460. The detection may be repeated until CEW is repositioned relative to a target location to establish a spacing (e.g., difference in targeted locations) greater than the spacing threshold value. When the change in targeted location associated with the change in targeted location is equal or greater than the threshold value, CEW 400 may automatically deploy another electrode in order to provide a complete circuit to target location via previous electrode and the other electrode.

In various embodiments, a spacing threshold value may comprise a predetermined distance. The predetermined distance may be selected to establish a minimum spacing between deployed electrodes at a remote location (e.g., target location 460). For example, the spacing threshold value may comprise a distance of five inches, six inches, seven inches, nine inches, or twelve inches. Alternately or additionally, the threshold value may comprise a distance (e.g., spacing) of at least five inches, at least six inches, at least seven inches, at least nine inches, or at least twelve inches according to various aspects of the present disclosure. By setting such predetermined spacing threshold value, a minimum spacing between electrodes in a series of deployed electrodes may be established and placement of two electrodes from a plurality of electrodes in close proximity to each other at a target location may be avoided. With such an arrangement, automatic deployment of electrodes may be provided in a selective and controlled manner.

Figure 5:
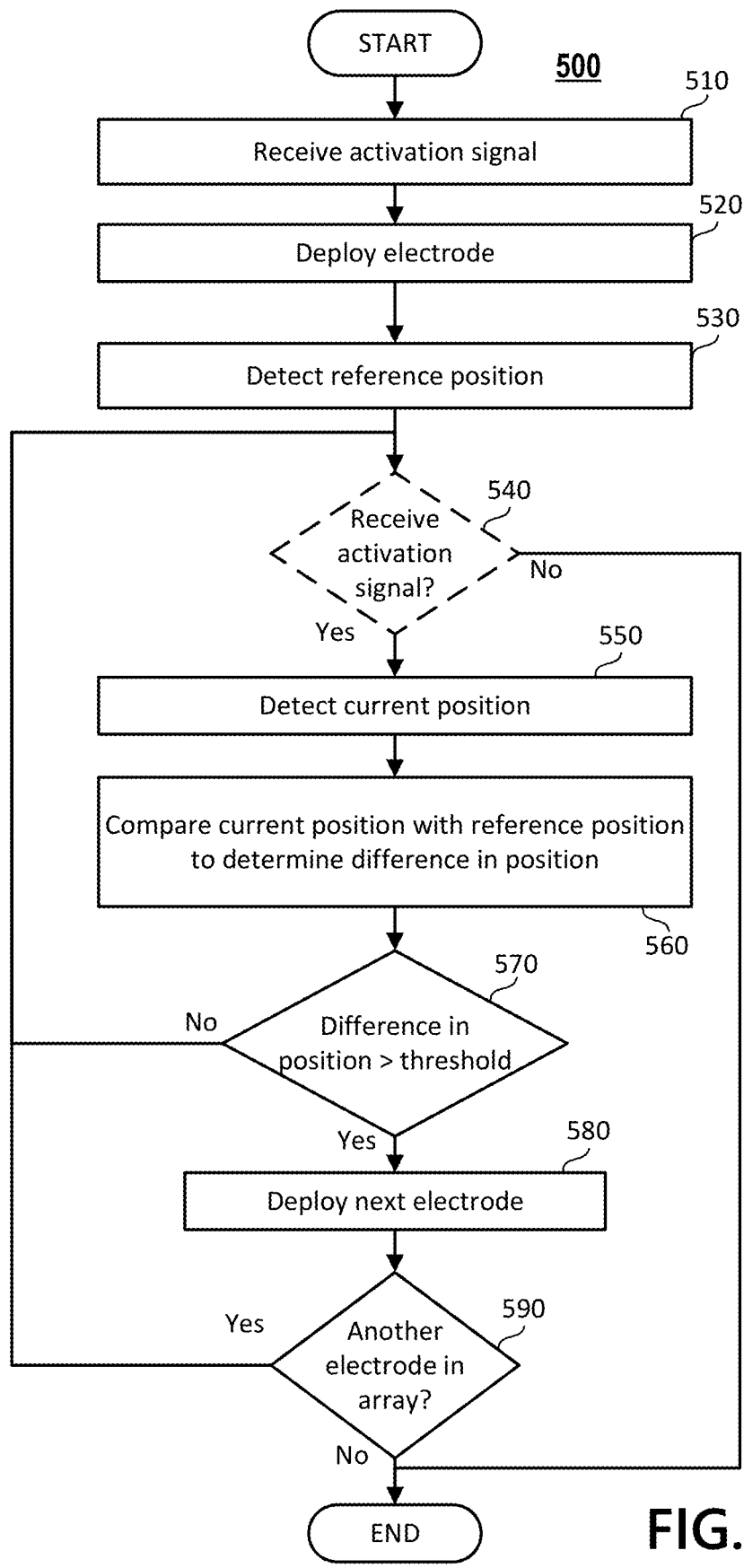
FIG. 5 illustrates a method of automatically deploying an electrode based on a change in position according to various aspects of the disclosure.

In various embodiments, electrode deployment based on a change in position of a conducted electrical weapon may be provided. The change in position may enable spacing of one or more second electrodes to be determined relative and automatically selected based on movement of the conducted electrical weapon. The spacing may be automatically selected and a timing of deployment for each subsequent electrode may be automatically determined independent of a speed at which the conducted electrical weapon is moved (e.g., swept) along a target location, enabling a target location for electrode to be rapidly selected. For example, in accordance with various embodiments and with reference to FIG. 5, an exemplary method 500 for automatically deploying an electrode based on a change in position may be provided according to various aspects of the disclosure. Method 500 may be performed by a conducted electrical weapon. The conducted electrical weapon may be configured to conduct an electrical stimulus signal via a plurality of electrodes. Each electrode of the plurality of electrodes may be deployed from the conducted electrical weapon. The conducted electrical weapon may be configured to perform one or more operations as shown in FIG. 5 and/or otherwise disclosed in the present disclosure. The conducted electrical weapon may correspond to one or more CEWs disclosed herein, including CEW 100, CEW 200, CEW 300, and/or CEW 400 with brief reference to FIGS. 1-4. Method 500 may comprise automatically deploying an electrode in accordance with a change in position of CEW 200, CEW 300, and/or CEW 400, as discussed above with reference to FIGS. 2-4. Method 500 depicts one combination of blocks (e.g., operations) that may be implemented in accordance with one embodiment. Those of ordinary skill in the art will realize that method 500 and/or any other implementations herein may utilize additional and/or fewer blocks, components, and/or systems (including those discussed with respect to other figures and/or known in the art). Each arrow shown in FIG. 5 may illustrate an example order of operations in which an operation may be performed before another operation as indicated by a direction of the arrow. Further, absent expressly indicating otherwise, the ordering of describing various implementations and blocks is merely for illustrative purposes and not intended to limit the scope of this disclosure. As understood by a person of ordinary skill in the art, a computer-readable medium comprising computer-executable instructions that are configured to be executed by a processor (e.g., processing circuit 110 comprising a processor and non-volatile memory storing the instructions, with brief reference to FIG. 1) may perform one or more processes disclosed herein.

Automatically deploying an electrode based on a change in position may comprise one or more of receiving an activation signal 510, deploying an electrode 520, detecting a reference position 530, detecting whether an activation signal continues to be received 540, detecting a current position 550, comparing a current position with a reference position to determine a difference in position 560, comparing the difference in position to a threshold value 570, deploying a next electrode 580, or determining whether another electrode is included in an array 590 in embodiments according to various aspects of the present disclosure.

Receiving an activation signal 510 may comprise receiving an activation signal configured to deploy a first electrode of a plurality of electrodes from an at a first time. The activation signal may be received via a control interface of the conducted electrical weapon. For example, the activation signal may be received via a trigger of the conducted electrical weapon. The activation signal may comprise one or more of activation signal 240, activation signal 340, and/or activation signal 445 with brief reference to FIGS. 2-4.

In accordance with (e.g., based on) receiving the activation signal 510, deploying an electrode 520 may be performed. The electrode may comprise a first electrode. The electrode may comprise a first electrode of a plurality of electrodes the conducted electrical weapon is configured to deploy. The electrode may comprise a first electrode in an array of electrodes selectable in accordance with the activation signal. For example, the electrode may comprise one or more of first electrode 230-1, first electrode 330-1, or first electrode 430-1, with brief reference to FIG. 2-4. The electrode may comprise a single electrode. Deploying the electrode 520 may comprise providing, via a processor of the conducted electrical weapon, an ignition signal to a deployment unit in which the electrode is disposed prior to being deployed. The ignition signal may be provided to the electrode via the deployment unit. The ignition signal may be provided via the handle to the deployment unit. For example, a single, individual ignition signal may be provided from a handle of the conducted electrical weapon to a first electrode of the plurality of electrodes.

Deploying an electrode 520 may comprise deploying the electrode at a time. The time may comprise a first time in a period of time in which an array of electrodes is deployed responsive to an activation signal. The time may comprise a start time of a duration of time in which the activation signal is received by the conducted electrical weapon. The time may comprise a beginning of the duration of time in which the activation signal is received by the conducted electrical weapon. The time may be immediate upon the activation signal being received. The electrode may be deployed immediately upon the activation signal being received via a user control interface.

In accordance with deploying the electrode 520, detecting a reference position 530 may be performed. The reference position may comprise a first position. The first position may comprise a first position of a conducted electrical weapon. The first position may comprise a first position of a handle of the conducted electrical weapon. Detecting the reference position 520 may comprise detecting a position of the conducted electrical weapon at a time the electrode is deployed. The position may be detected via a position detector of the conducted electrical weapon. For example, a gyroscope of the conducted electrical weapon may provide information regarding the position of the conducted electrical weapon and a processing circuit (e.g., position sensor 170 may provide position information to processing circuit 110 with brief reference to FIG. 1). The position may be detected by a processing circuit of the conducted electrical weapon via the position detector. Information regarding the position may be stored in the conducted electrical weapon (e.g., in processing circuit 110 with brief reference to FIG. 1) for subsequent processing by the conducted electrical weapon.

In embodiments, the reference position may comprise a physical position of the conducted electrical weapon. For example, the reference position may comprise one or more of an orientation of the conducted electrical weapon or a spatial location of the conducted electrical weapon. Detecting the reference position 530 may comprise detecting a direction and/or spatial location of the handle of the conducted electrical weapon at a time an electrode is deployed from the conducted electrical weapon (e.g., at a time of deploying 520). For example, the position may comprise one or more of first direction 255-1 and first spatial location 320-1 with brief reference to FIGS. 2A and 3.

In embodiments, the reference position may comprise a relative position (e.g., first relative position) between the conducted electrical weapon and a remote location. The relative position may be determined in accordance with a physical position of the conducted electrical weapon. The relative position may be determined in accordance with a physical position of the remote location. The relative position may be determined in accordance with a distance (e.g., first distance) from the conducted electrical weapon to a remote location. The relative position may comprise a targeted location (e.g., first targeted location). The targeted location may be determined relative to a physical position of the conducted electrical weapon. The targeted location may comprise a spatial location remote from the conducted electrical weapon. For example, the targeted location may comprise a remote spatial location located a distance away from a spatial position of the conducted electrical weapon along a direction in which the CEW is oriented. The reference position may be determined in accordance with physical positions of the CEW and/or the targeted location, including differences between such physical positions. For example, the reference position of CEW 400 at a first time may comprise one or more of first position 420-1, first direction in which CEW 400 is oriented, a distance between handle 410 and target location 460, or first targeted location 425-1 with brief reference to FIG. 4.

In embodiments, detecting the reference position 530 may comprise detecting a targeted location (e.g., a first targeted location). For example, detecting the reference position 530 may comprise detecting first targeted location 425-1 with brief reference to FIG. 4. The targeted location may be detected relative to a position of the CEW. For example, first targeted location 425-1 may be detected relative to first position 420-1 of CEW 400. The targeted location may be further detected in accordance with one or more of a spatial location of the position or an orientation of the position. A direction and/or spatial location of a position of the CEW may be detected as discussed above. For example, detecting the reference position 530 may comprise detecting one or more of a spatial location of first position 420-1 or first orientation 440-1 of first position 420-1 with brief reference to FIG. 4.

In various embodiments a targeted location may be further detected in accordance with a distance between the CEW and a target location. The distance may be detected by a distance sensor of the CEW. Alternately, the distance may comprise a predetermined distance and/or a distance measured via one or more electrodes deployed from the conducted electrical weapon. For example, to detect first spatial location 425-1, a first distance between CEW 400 and target location 460 may be determined. Detecting the reference position 530 may comprise detecting the first distance between handle 410 and target location 460. The targeted location may be calculated in accordance with a distance away from a spatial position of the conducted electrical weapon and/or a distance away in a direction in which the CEW is oriented. For example, detecting first targeted location 425-1 may comprise calculating first targeted location 425-1 in accordance with the first distance and the at least one of the spatial location of first position 420-1 or first orientation 440-1. Detecting the reference position 530 may comprise calculating first targeted location 425-1 as a spatial location located the determined distance away from the spatial position of first position 420-1 and/or a spatial location positioned the determined distance away from CEW 400 in at least one direction of first orientation 440-1 in which CEW 400 is oriented. Upon detecting first targeted location 425-1, information regarding first targeted location 425-1 may be stored by a handle of CEW 400 for further processing. For example, the information may be stored to enable a spacing at remote location 460 to be determined relative to first targeted location 425-1.

After deploying the electrode 520 and detecting a reference position 530, detecting a change in position may be performed. In embodiments, detecting the change in position may comprise one or more of detecting whether an activation signal continues to be received 540, detecting a current position 550, comparing a current position with a reference position to determine a difference in position 560, or comparing the difference in position to a threshold value 570.

In various embodiments, detecting a change in position may comprise detecting whether an activation signal continues to be received 540. The activation signal may be a same activation signal as detected at operation 510. The activation may be received for a duration of time. The duration of time may comprise a continuous period of time. A user control interface of the weapon may be actuated during the duration of time to provide the activation signal. Detecting whether the activation signal continues to be received may comprise detecting the activation signal at a second time, subsequent to a first time at which the activation signal was initially received and/or detected by the conducted electrical weapon. The second time may comprise an intermediate time of the duration of time before the activation signal is no longer detected and/or received by the conducted electrical weapon. The second time may comprise an end time of the duration of time during which the activation signal is received. In embodiments, the duration of time may comprise at least one second, at least three seconds, at least five seconds, or at least seven seconds. When the activation signal is detected upon detecting 540, the activation signal may be determined to be continuously received between deploying an electrode (e.g., first electrode, prior electrode, etc.) and deploying of a next electrode (e.g., second electrode, subsequent electrode, another electrode, etc.).

In various embodiments, detecting whether an activation signal continues to be received 540 may be optional. Detecting whether the activation signal continues to be received 540 may be excluded from method 500. Method 500 may comprise receiving an activation signal 510 in association with deploying a first electrode and then automatically deploying one or more next electrodes independent of whether an activation signal is subsequently received. The one or more next electrodes may be deployed independent of whether a same or different activation signal is received. A next electrode may be deployed independent of (e.g., without, regardless of, etc.) whether an activation signal is detected after the first electrode is deployed. The next electrode may be deployed in accordance with detecting a change in position, but independent of whether an activation signal, including a same activation signal associated with deploying the first electrode, continues to be received by the conducted electrical weapon. The activation signal associated with deploying the first electrode may be discontinued prior to deploying a next electrode (e.g., a second electrode) in an array of electrodes according to various aspects of the present disclosure. Despite the activation signal being discontinued, the next electrode may be automatically be deployed in accordance with a detected change in physical and/or relative position of the conducted electrical weapon, thereby decreasing an amount of processing needing to be performed by the conducted electrical weapon relative to detecting 540 being required.

When the activation signal is not detected upon detecting 540, method 500 may end. When an activation signal is no longer detected, deployment of a next electrode may be prevented. The activation signal may be discontinued when, for example, a stimulus signal has been successful conducted via at least two previously deployed electrodes of the plurality of electrodes. The activation signal may alternately and/or additionally may be ended when a stimulus signal is no longer necessary to be provided from the conducted electrical weapon. The activation signal may cease to be provided and method 500 may end independent of whether each electrode of the plurality of electrodes has been deployed. Method 500 may end in accordance with the lack of detection of the activation signal independent of whether each electrode of an array of electrodes for the activation signal has been deployed. When the activation signal is no longer detected, deployment of an array of electrodes may be terminated.

In embodiments, detecting a current position 550 of the conducted electrical weapon may be performed. Detecting the current position 550 may be performed responsive to receiving 540 or, alternately, detecting 530. The current position may comprise a second position. Detecting the current position 550 may correspond to detecting a reference position 530 repeated at a later time. Detecting the current position 550 may comprise detecting a position of the conducted electrical weapon at a time after at least one previous electrode has been deployed. The current position may be detected via a position detector of the conducted electrical weapon. For example, a gyroscope of the conducted electrical weapon may provide information regarding the position of the conducted electrical weapon and a processing circuit (e.g., position sensor 170 may provide position information to processing circuit 110 with brief reference to FIG. 1). The position may be detected by a processing circuit of the conducted electrical weapon via the position detector.

In embodiments, the current position may comprise a second physical location of the conducted electrical weapon. For example, the current position may comprise one or more of a second orientation of the conducted electrical weapon or a second spatial location of the conducted electrical weapon. Detecting the current position 550 may comprise detecting a direction and/or spatial location of the conducted electrical weapon at a time (e.g., current time) after a time at which an electrode was previously deployed from the conducted electrical weapon. Detecting the current position 530 may comprise detecting a direction and/or spatial location of the conducted electrical weapon prior to deploying a next electrode. For example, the current position may comprise one or more of second direction 255-2 and second spatial location 320-2 with brief reference to FIGS. 2B and 3.

In embodiments, the current position may comprise a relative position (e.g., second relative position) between the conducted electrical weapon and a remote location. The relative position may be determined in accordance with a physical position of the conducted electrical weapon. The current position may be determined in accordance with a physical position of the remote location. The physical position of the conducted electrical weapon may be determined after a time of deploying the electrode 520 and/or a different physical position relative to a physical position is detected at detecting reference position 530. The current position may be determined in accordance with a distance (e.g., second distance) from the conducted electrical weapon to a remote location. The relative position may comprise another targeted location (e.g., second targeted location). The targeted location may be determined relative to the physical position of the conducted electrical weapon. For example, the targeted location may comprise a remote second spatial location located a second distance away from a second spatial position of the conducted electrical weapon along a second direction in which the conducted electrical weapon is oriented. The current position may be determined in accordance with physical positions of the CEW and/or the targeted location, including differences between such physical positions. For example, the current position may include one or more of a second position 420-2, second direction in which CEW 400 is oriented, a second distance to a target location 460, or second targeted location 425-1 with brief reference to FIG. 4.

In embodiments, detecting the current position 550 may comprise detecting a targeted location (e.g., second targeted location). The second targeted location may be detected prior to deploying a next electrode toward the second targeted location. For example, detecting the current position 550 may comprise detecting second targeted location 425-2 with brief reference to FIG. 4. The targeted location may be detected relative to a position of the CEW. For example, second targeted location 425-2 may be detected relative to second position 420-2 of CEW 400. The targeted location may be further detected in accordance with one or more of a spatial location of the position or an orientation of the position. A direction and/or spatial location of a position of the CEW may be detected as discussed above. For example, second targeted location 425-2 may be further detected in accordance with the one or more of the spatial location of second position 420-2 or second orientation 440-4 of second position 420-2. Detecting the current position 550 may comprise detecting one or more of the spatial location of second position 420-2 or second orientation 440-2 of second position 420-2 with brief reference to FIG. 4.

In various embodiments, a targeted location may be further detected in accordance with a distance between the CEW and a target location. The distance may be measured by a distance sensor of the conducted electrical weapon. Alternately or additionally, the distance may comprise a predetermined distance or a previously measured distance. For example, the distance may comprise a first distance measured upon detecting 530. In some embodiments, the distance may be further determined by adjusting the first distance in accordance with a difference in position between a first spatial location of the conducted electrical weapon (e.g., as detected at detecting 530) and a current spatial location as detected via a position sensor of the conducted electrical weapon. For example, to detect second spatial location 425-2, a second distance between CEW 400 and target location 460 may be determined. Detecting the current position 550 may comprise detecting the second distance between handle 410 and target location 460. The targeted location may be calculated in accordance with a distance away from a spatial position of the conducted electrical weapon and/or a distance away in a direction in which the CEW is oriented. Detecting the current position 550 may comprise further calculating a targeted location in accordance with a distance away from a spatial position of the conducted electrical weapon and/or along a direction in which the CEW is oriented. For example, detecting second targeted location 425-2 may comprise calculating second targeted location 425-2 in accordance with the second distance and the at least one of the spatial location of second position 420-2 or second orientation 440-2 of second position 420-2. Second targeted location 425-2 may be calculated as a spatial location located the determined distance away from the spatial position of second position 420-2 and/or a spatial location positioned the determined distance away from CEW 400 in at least one direction of second orientation 440-2 in which CEW 400 is oriented. Upon detecting second targeted location 425-2, information regarding second targeted location 425-2 may be stored by a handle of CEW 400 for further processing.

In accordance with detecting the current position 550, comparing a current position with a reference position 560 may be performed. The comparing 560 may be performed to determine (e.g., calculate, etc.) an amount of movement of the conducted electrical weapon. The amount of movement may comprise, for example, a rotation and/or translation of the conducted electrical weapon. The amount of movement may comprise a difference in position of the conducted electrical weapon. The difference in position may comprise a difference in the physical position of the conducted electrical weapon between a first time at which a previous electrode was deployed and a current time. Comparing the current position and the reference position 560 may comprise one or more of subtracting the current position from the reference position, determining a difference between the current position and the reference position in at least one of a direction or a plane, and determining an absolute value of a difference between the reference position and the current position.

In various embodiments, the difference in position may comprise an angle between a first direction (e.g., first orientation) of the conducted electrical weapon and a second direction (e.g., second orientation) of the weapon. Detecting the change in position may comprise detecting, via the position detector, the first orientation of the conducted electrical weapon at a first time the first electrode is deployed. Detecting the change in position may comprise detecting, via the position detector, the second orientation of the conducted electrical weapon different from the first orientation. Detecting the change in position may comprise calculating the angle between the first direction and the second direction to determine a difference in position. For example, an angle 250 may be detected between first direction 255-1 and second direction 255-2 with brief reference to FIG. 2. The angle may be detected (e.g., determined) within a single plane of motion. The single plane may comprise a vertical plane of motion. The single plane of motion may comprise a diagonal plane of motion.

In various embodiments, the difference in position may comprise a distance. The distance may be defined between a first spatial location of the conducted electrical weapon and a second spatial location of the conducted electrical weapon. Detecting the change in position may comprise detecting, via a position detector, the first spatial location of the conducted electrical weapon at a first time a first electrode is deployed. Detecting the change in position may comprise detecting, via the position detector, the second spatial location of the conducted electrical weapon different from the first spatial location. The distance may comprise a linear distance between the first spatial location and the second spatial location.

In various embodiments, the difference in position may comprise a spacing. The spacing may include a spacing at a remote location. The spacing may be defined between a first target location of the conducted electrical weapon and a second targeted location of the conducted electrical weapon. Detecting the change in position may comprise detecting, via a position detector, the first targeted location of the conducted electrical weapon at a first time a first electrode is deployed. Detecting the change in position may comprise detecting, via the position detector, the second targeted location of the conducted electrical weapon different from the first spatial location. The spacing may comprise a linear distance between the first spatial location and the second targeted location. The first targeted location may comprise a spatial location remote from the conducted electrical weapon. The second targeted location may comprise another (e.g., second) spatial location remote from the conducted electrical weapon. The second spatial location may comprise a same or different spatial location as the first spatial location. The second spatial location may be detected at a time after the first spatial location is detected.

In accordance with the comparing 560, comparing the difference in position to a threshold value 570 may be performed. The threshold value may be configured to cause deployment of another electrode at a predetermined spacing between the other electrode and a previous electrode at a target location. In some embodiments. the threshold value may be determined relative to a predetermined distance of deployment between the conducted electrical weapon and a target location. For example, the threshold value may be selected in accordance with a predetermined deployment distance of at least ten feet, at least fifteen feet, at least twenty feet, at least twenty-five feet, at least thirty feet, or greater than thirty-five feet. In other embodiments, the threshold value may be determined in accordance with a distance measured by the conducted electrical weapon. For example, a first angle threshold value or first distance threshold value may be selected when a first distance is detected, while a second angle threshold value or second distance threshold value may be selected when a second distance is detected. The first distance may be less than the second distance. In some embodiments, the first angle threshold value may be greater than the second distance threshold value. Alternately or additionally, the first distance threshold value may be greater than the second distance threshold value. The threshold value may be selected to provide a minimum spacing at a minimum distance of deployment for automatically deploying another electrode toward a target location. The threshold value may comprise one or more of an angle threshold value, a distance threshold value, a spacing threshold value, or a combination of an angle threshold value and a distance threshold value. When the difference in position is equal or greater than the threshold value (e.g., exceeds the threshold value), the change in position may be detected in accordance with various aspects of the present disclosure. The change in position may be detected responsive to the difference in position being equal or greater than the threshold value in accordance with the comparing 570. When the difference in position is less than the threshold value, the change in position may not be detected in accordance with the comparing 570. When the change in position is not detected in accordance with comparing 570, detecting 550 may be repeated at a next time. When the difference in position is less than the threshold value, detection of a current position may be repeated as shown in FIG. 4. The repeated detection may be performed until the change in position is detected.

In embodiments, detecting the change in position may comprise comparing a difference in position to a distance threshold value. The difference in position may comprise a distance. Comparing the distance may comprise determining the distance is equal or greater than the distance threshold value. For example, distance 325 between first spatial location 320-1 and second spatial location 320-2 may be compared to a distance threshold value with brief reference to FIG. 3. In embodiments, the distance threshold value may be five inches. The distance threshold value may be at least three inches, at least five inches, at least seven inches, at least nine inches, or at least eleven inches. When the difference in position is equal or greater than the distance threshold value, the change in position may be detected. When the difference in position is less than the distance threshold value, the change in position may not be detected.

In embodiments, detecting the change in position may comprise comparing a difference in position to an angle of orientation to an angle threshold value. The difference in position may comprise an angle of orientation. Comparing the angle may comprise determining the angle is equal or greater than the angle threshold value. In embodiments, the angle threshold value may be five degrees. The angle threshold value may be at least three degrees (e.g., greater than three degrees), at least five degrees, at least seven degrees, at least nine degrees, or greater than eleven degrees. For example, angle 250 between first direction 255-1 and second direction 255-2 and compared to a threshold angle value, with brief reference to FIG. 2. When the difference in position is equal or greater than the angle threshold value, the change in position may be detected. When the difference in position is less than the angle threshold value, the change in position may not be detected.

In embodiments, detecting the change in position may comprise comparing a difference in position to a spacing threshold value. The difference in position may comprise a spacing. Comparing the spacing may comprise determining the spacing is equal or greater than the spacing threshold value. For example, spacing 450 between first targeted location 425-1 and second targeted location 425-1 may be compared to a spacing threshold value with brief reference to FIG. 4. In embodiments, the distance threshold value may be five inches. The distance threshold value may be six inches. The distance threshold value may be at least three inches, at least five inches, at least six inches, at least seven inches, at least nine inches, at least eleven inches, or at least twelve inches. When the difference in position is equal or greater than the spacing threshold value, the change in position may be detected. When the difference in position is less than the spacing threshold value, the change in position may not be detected.

When the change in position is detected, automatically deploying a next electrode 580 may be performed. The next electrode may comprise a second electrode. The second electrode may be automatically deployed after a first electrode. For example, the next electrode may comprise one or more of second electrode 230-2, second electrode 330-2, or second electrode 430-2 with brief reference to FIGS. 2B, 3, and 4. Deploying the next electrode 580 may comprise providing, by a processing circuit of the conducted electrical weapon, an ignition signal (e.g., second ignition signal) to a deployment unit received by a handle of the conducted electrical weapon. Providing the ignition signal pay comprise providing the ignition signal to an electrode via the deployment unit, wherein the electrode is disposed in the deployment unit.

Deploying a next electrode 580 may comprise deploying the electrode at a time. The time may comprise a second time in a period of time in which an array of electrodes is deployed responsive to an activation signal. The time may comprise an intermediate time of a duration of time in which the activation signal is received by the conducted electrical weapon. The duration of time may comprise a continuous period of time from the first time to the time at which the next electrode is deployed.

In embodiments, deploying the next electrode 580 may comprise generating an audible indicator. The audible indicator may be output (e.g., transduced into sound) via an audio output device of the conducted electrical weapon. For example, audio output device 180 of CEW may generate the audible indicator in accordance with deploying the next electrode. In embodiments, the audible indicator may comprise one of a first audible indicator and a second audible indicator, wherein the first audible indicator is different from the second audible indicator. The first audible indicator may comprise a first tone with one or more of a first length and first frequency. The second audible indicator may comprise a second tone with one or more of a second length and second frequency. The first audible indicator may be generated for a first electrode or intermediate (e.g., second) electrode of an array comprising three or more electrodes. In embodiments, the second audible indicator may be generated for a last electrode of an array of electrodes. For example, for a first and second electrode in a sequence of three deployed electrodes, a first audible indictor may be generated, while the second audible indicator may be generated for the third electrode of the sequence of three deployed electrodes. In embodiments, an audible indicator may be generated for a last deployed electrode in an array, but not for one or more previously deployed electrodes in the array. The one or more previously deployed electrodes in the array may comprise all previously deployed electrodes in the array.

In embodiments, the next electrode may comprise a subsequent electrode in an array of electrodes. For example, the next electrode may comprise a third electrode. The third electrode may be automatically deployed after a second electrode was automatically deployed at a previous performance of automatically deploying 580. The third electrode may be automatically deployed in accordance with one or more of a third position, a third angle of orientation, and/or a third spatial location determined in accordance with detecting 550. The third position may be different from the first position and the second position. The third spatial location may be different from the first spatial location and the second spatial location. The third angle of orientation may be different from the first angle of orientation and the second angle of orientation. The third electrode may be automatically deployed in accordance with one or more of a second difference in position, second distance, second angle of orientation, and/or second threshold value in accordance with one of comparing 560 and comparing 570. In embodiments, difference in position may be determined between the third position and one of the first position and the second position. The second distance may be determined between the third spatial location and one of the first spatial location and the second spatial location. The second angle of orientation may be determined between the third orientation and one of the first orientation and the second orientation. In embodiments, one or more operations for detecting the change in position may be repeated for automatically deploying each subsequent electrode in an array of electrodes after a first electrode in the array.

In embodiments, comparing 560 may comprise measuring a distance between the conducted electrical weapon and a location of the target. The distance may be different from a distance measured at detecting 550. The distance may comprise a deployment distance (e.g., distance of deployment). The distance may be measured via the first electrode and the second electrode. For example, the conducted electrical weapon may detect a time of flight between deploying the second electrode and detecting the second electrode at a target location via the first electrode. For example, the first electrode may detect the second electrode via a signal provided at the target location by the second electrode. The signal may comprise a low voltage signal. The first electrode may detect the signal when the signal is conducted to the first electrode via a target at the target location, wherein each of the first electrode and the second electrode are electrically coupled to the target to enable to signal to be conducted via the target. In other embodiments, the second distance may be detected by a distance sensor of the conducted electrical weapon as discussed above.

In embodiments, a deployment distance may be used to adjust a threshold value. The threshold value maybe adjusted to determine an adjusted threshold value. For example, a threshold may be set relative to a default value upon deployment of a first electrode and second electrode. The default value may correspond to a default distance. For a deployment distance greater than the default distance, adjusting the threshold value may comprise decreasing the threshold value. For a deployment distance less than the default distance, adjusting the threshold value may comprise increasing the threshold value. For a deployment distance equal to the default distance, adjusting the threshold value may comprise maintaining the threshold value unchanged. Automatically deploying a third and/or subsequent electrode of a plurality of electrodes may be performed based on a comparison relative to the adjusted threshold value. Such adjustments may enable a minimum spacing to be established for a third or subsequent electrode relative to at least one of the first electrode or second electrode. The minimum spacing may established in accordance with a detected deployment distance between the target location and the conducted electrical weapon.

In embodiments, and in accordance with automatically deploying a next electrode 580, determining whether another electrode 590 is included in an array of electrodes. An array of electrodes may comprise a subset of electrodes (e.g., less than all) of a plurality of electrodes deployable from a conducted electrical weapon. For example, a magazine of the conducted electrical weapon may comprise ten undeployed electrodes, while a first array of electrodes of this plurality of electrodes may comprise three of the ten electrodes available for deployment at a given time during operation the conducted electrical weapon. Electrodes of a plurality of electrodes of a conducted electrical weapon associated with each array may be predetermined. The conducted electrical weapon may be configured to deploy the array responsive to a single activation signal (e.g., same activation signal). For example, a first array may be deployed in accordance with a first activation signal and a second array may be deployed in accordance with a second activation signal. The array may be deployed (e.g., initially deployed and automatically deployed) while the activation signal is received. When an activation signal is no longer received, method 500 may end. When another next electrode is included in the array and not yet deployed at determining 590, detecting 540 may be repeated for the next another electrode. When another electrode is not included in the array at determining 590, method 500 may end.

In various embodiments, determining whether another electrode 590 is included in an array of electrodes may comprise detecting a connection status between the deployed next electrode and a target. For example, determining 590 may comprise coupling a voltage to the next deployed electrode and, responsive to the voltage, detecting an electrical signal. The electrical signal may comprise an electrical signal coupled via the deployed next electrode and a previously deployed electrode through the target. The electrical signal may be detected in accordance with a voltage and/or current of the electrical signal received at the handle of the CEW. The connection status may be determined in accordance with the detected electrical signal. When the electrical signal is detected (e.g., non-zero voltage or current, equal or greater than a threshold voltage or current, etc.), the connection status may comprise the next deployed electrode being coupled to the target. When the electrical signal is not detected (e.g., zero voltage or zero current, less than a threshold voltage or current), the connection status may comprise the next deployed electrode being decoupled from the target. In some embodiments, when the connection status comprises the next deployed electrode being connected (e.g., coupled) to the target, another electrode may not be determined to be included in the array. The connection status of connected may indicate that a conductive path has been established through the target for providing a stimulus signal and another electrode does not need to be deployed. When the next deployed electrode is detected to be coupled to the target, another partial circuit path between the CEW may not need to be provided in order to deliver the stimulus signal to the target at a remote location. When the connection status comprises the next deployed electrode being disconnected (e.g., decoupled) from the target, another electrode may be determined to be included in the array. The other electrode may provide an additional partial circuit path through which a stimulus signal may be provided to a target when a previously deployed electrode is determined to not be effective for delivering a stimulus signal to the target.

In various embodiments, determining 590 may comprise detecting a connection status for each deployed electrode. Detecting the connection status of each deployed electrode may comprise generating a number of connected electrodes. When a number of electrodes coupled to a target is less than a threshold number, another electrode may be determined to be available in the array at determining 590. The threshold number may comprise a predetermined number of connected electrodes. For example, the threshold number may comprise two electrodes, three electrodes, four electrodes, or more than four electrodes. When a number of electrodes coupled to a target is equal or greater than the threshold number, another electrode may be determined to not be available in the array at determining 590. In accordance with a detected connection status, an electrical coupling for likely causing NMI of a target may be provided, while minimizing a number of deployed electrodes in accordance with a predetermined threshold number of connected electrodes.

In various embodiments, determining whether another electrode 590 is included in an array of electrodes may comprise detecting a spacing between two previously deployed electrodes. For example, a deployment distance may be detected as discussed above. Further, a detected change in position may be used with the deployment distance to calculate a spacing between two or more electrodes associated with the detected change in position. When the spacing is less than a spacing threshold value, another electrode may be determined to be included in the array and detecting 540 may be repeated. When the spacing is greater than the spacing threshold value, another electrode may be determined to not be available for the array and method 500 may end. The spacing threshold value may comprise a distance associated with causing NMI. For example, the spacing threshold value may comprise at least six inches, at least nine inches, or at least twelve inches. Accordingly, an array of deployed electrodes may continue to be deployed until a predetermined spacing is determined to have been established at a target location. A number of electrodes deployed in and array and in accordance with an activation signal may be adjusted based on whether the spacing has been established at the target location. Such an arrangement may enable a minimum number of electrodes likely to cause NMI to be automatically deployed from the conducted electrical weapon in a controlled manner. After the spacing is detected, each subsequent array of the conducted electrical weapon may automatically be selected (defined, redefined, set, etc.) to include a single electrode.

In various embodiments, methods of automatically deploying one or more arrays of electrodes are provided. For example, and with reference to FIG. 6, exemplary method 600 may be performed by a conducted electrical weapon to deploy one or more arrays of electrodes. The conducted electrical weapon may comprise one or more CEWs disclosed herein, including CEW 100, CEW 200, CEW 300, and/or CEW 400 with brief reference to FIGS. 1-4. The conducted electrical weapon may be configured to deploy a plurality of electrodes. For example, the conducted electrical weapon may comprise a magazine in which a plurality of deployment units may be received, wherein each deployment unit comprises an individually deployable electrode. The conducted electrical weapon may be configured to perform one or more operations to selectively deploy one or more of the electrodes in an array of electrodes according to various aspects of the present disclosure. The plurality of electrodes may be selectively deployed in accordance with a plurality of arrays of electrodes. Such operations may comprise one or more of receiving an initial activation signal 610, deploying one or more electrodes in a next array 620, determining whether another array is available 630, receiving a next activation signal 640, or deploying a single electrode 650.

In various embodiments, an array may be deployed based on an activation signal. The activation signal may be a same activation signal. Each electrode of the array of electrodes may be deployed responsive to the same activation signal. The activation signal may comprise a continuously received signal. The activation signal may be continuously received at a respective time of deployment of each electrode in the array of electrodes. In other embodiments, each electrode deployed after a first electrode in the array may be automatically deployed independent of whether the same activation signal is received after the first electrode is deployed.

In various embodiments, an array may comprise two or more electrodes. A number of the two or more electrodes of the array may be predetermined. A maximum number of electrodes for each array deployed in response to a respective activation signal may be predetermined. For example, the number of the two or more electrodes may be selected based on a mode (e.g., configuration, setting, etc.) selected via a user control interface of the conducted electrical weapon. In embodiments, the number of electrodes may comprise two electrodes, three electrodes, four electrodes, or more than four electrodes. The two or more electrodes may comprise a first electrode and two or more next electrodes. The two or more electrodes may comprise a subset (e.g., less than all) of a plurality of electrodes deployable from a conducted electrical weapon. The two or more electrodes may comprise a subset of electrodes in a magazine of the conducted electrical weapon at a given time. The two or more electrodes may comprise less than all electrodes deployable from a magazine of the conducted electrical weapon at a given time. The conducted electrical weapon may select the two or more electrodes in accordance with firing tubes of the magazine. For example, a first subset of firing tubes may be selected for receiving respective first ignition signals responsive to a first activation signal and a second subset of firing tubes may be selected for receiving respective second ignition signals responsive to a second activation signal. In embodiments, the firing tubes may comprise different subsets of firing tubes of the plurality of firing tubes.

In various embodiments, the two or more electrodes of an array may be deployed sequentially. For example, one or more next electrodes in the array may be deployed after a first electrode of the array has been deployed. The first electrode may be deployed at a first time and each second electrode of one or more second electrodes (e.g., next electrodes) of the array may be deployed at a chronologically subsequent, respective second time (e.g., next time) after the first time. The two or more electrodes of the array may be deployed sequentially based on a single activation signal associated with an array and a change in position of the weapon between each sequential pair of electrodes of the two or more electrodes in the array.

In various embodiments, two arrays of electrodes may comprise different numbers of electrodes. A first array may include a first number of a plurality of electrodes that is less than or greater than a second number of the plurality of electrodes of a second array. For example, the first array may include three electrodes and the second array may include two electrodes. In embodiments, a conducted electrical weapon may be configured to deploy a first array with a greater number of electrodes before a second array with a lesser number of electrodes relative to the first array. The first array may comprise different electrodes relative to the second array. A same electrode may not be included in two different arrays according to various aspects of the present disclosure.

In various embodiments, each array of two or more electrodes may be deployed based on different activation signals. The activation signals may be received sequentially, causing the two or more arrays to be deployed sequentially in accordance with each activation signal. For example, a first array may be deployed responsive to a first activation signal and a second array may be deployed responsive to a second activation signal. The first activation signal may end prior to the second activation signal being initially received. The second array may be configured to be deployed when the first activation signal is received, but the second array may be prevented from being deployed until the second activation signal is received.

In various embodiments, and to start, receiving an initial activation signal 610 may be performed. The initial activation signal may comprise a first activation signal. The initial activation signal may comprise a sequentially first activation signal in a series of activation signals received during a period of use of the conducted electrical weapon. At a time the initial activation signal is received, a plurality of electrodes may be provided for being deployed from the conducted electrical weapon. The initial activation signal may be received after a plurality of electrodes are loaded into the conducted electrical weapon. Alternately or additionally, the initial activation signal may be received at a time at which the conducted electrical weapon comprises deployable electrodes for at least two arrays of electrodes. The initial activation signal may be received via user control interface of the conducted electrical weapon. Receiving the initial activation signal 610 may correspond to receiving an activation signal 510 with brief reference to FIG. 5.

In accordance with receiving the initial activation signal, deploying one or more electrodes in a next array 620 may be performed. The next array may comprise a first array. The next array may comprise an initial array of a plurality of arrays the conducted electrical weapon is configured to deploy when the first activation signal is received. Deploying the one or more electrodes in the next array may comprise one or more operations 520-590 of method 500, with brief reference to FIG. 5.

In various embodiments, a conducted electrical weapon may be configured to deploy multiple arrays. For example, and with brief reference to FIG. 7A-7B, multiple arrays of electrodes deployable in response to different activation signals may be provided from a conducted electrical weapon. CEW 700 may correspond to one or more CEWs disclosed herein, including CEW 100, CEW 200, CEW 300, and/or CEW 400 with brief reference to FIG. 1-4. FIG. 7A shows an example view of a deployment end of CEW 700 from which a plurality of electrodes is configured to be deployed from CEW 700. CEW 700 is configured to deploy multiple arrays. The multiple arrays may comprise three arrays. The multiple arrays may comprise first array 710, second array 720, and third array 730. CEW 700 may be further configured to deploy a single electrode 740. First array 710, second array 720, and third array 730 may be deployed in accordance with a different respective activation signals received by CEW 700. First array 710 may be deployed based on a first activation signal. Second array 720 may be deployed based on a second activation signal different from the first activation signal. Third array 730 may be deployed based on a third activation signal different from the first activation signal and the second activation signal. Each array of the first array 710, second array 720, and third array 730 may comprise a same number of electrodes. Each array of the first array 710, second array 720, and third array 730 may comprise at least two electrodes. First array 710 may comprise three electrodes and second array 720 may comprise three electrodes. First array 710 may comprise a first electrode and a second electrode different from each of the two or more electrodes in second array 720. First array 710 may further comprise a third electrode different from each electrode of second array 720 and third array 730. First electrode 710 comprise a first three-electrode array and second array 720 comprise a second three-electrode array. While first array 710, second array 720, and third array 730 are illustrated as comprising specific columns of electrodes of CEW 700, embodiments according to various aspects of the present disclosure may comprise different combinations of electrodes for arrays, including arrays from a row of electrodes, and one or more electrodes from different rows and/or columns of a conducted electrical weapon.

Figure 7B:
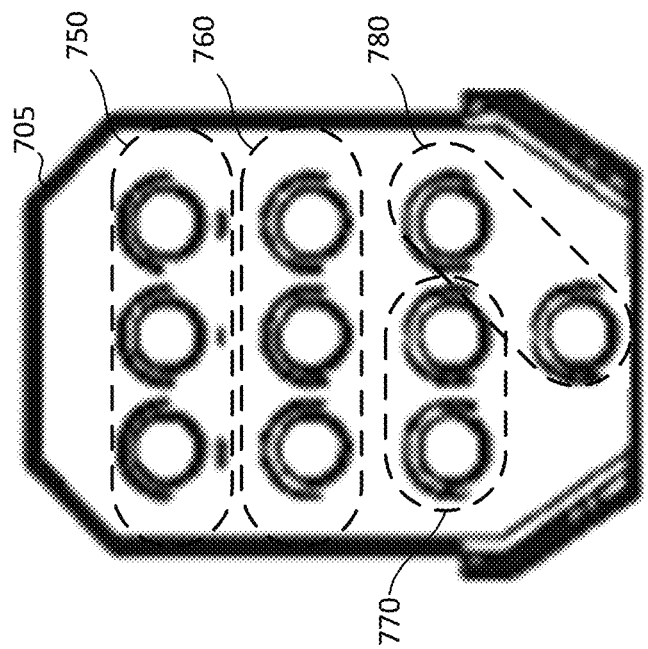
FIGS. 7A-7B illustrate example arrays of electrodes deployable in response to different activation signals according to various aspects of the disclosure.
Figure 7A:
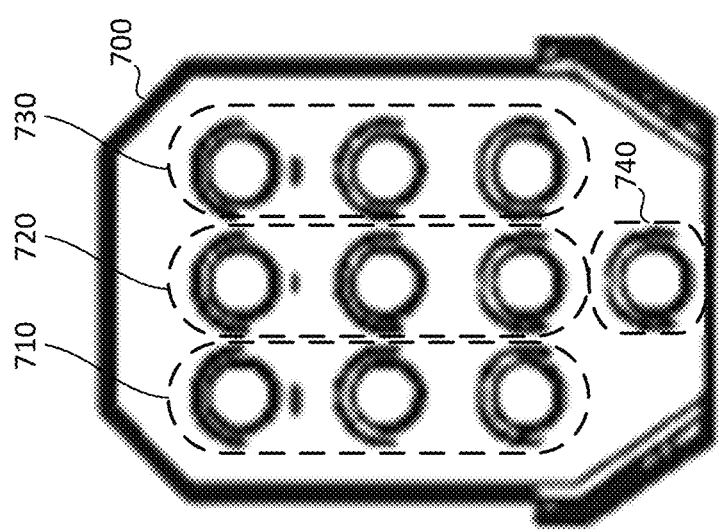

In an alternate example configuration, FIG. 7B shows an example view of a deployment end of an alternate conducted electrical weapon according to various aspects of the present disclosure. A magazine and multiple firing tubes may be visible at the deployment end of the conducted electrical weapon. CEW 705 may correspond to CEW 700 with a different configuration of arrays. CEW 705 may comprise different multiple arrays relative to CEW 700. A same magazine may be employed in each of CEW 700 and CEW 705, though different sets of arrays may be deployed from CEW 700 and CEW 705 in accordance with a respective configuration of each of CEW 700 and CEW 705. CEW 705 may be configured to deploy multiple arrays. The multiple arrays may comprise more than three arrays. The multiple arrays may comprise four arrays. The multiple arrays may comprise first array 750, second array 760, third array 770, and fourth array 780. The multiple arrays may be deployed in accordance with a different respective activation signals received by CEW 705. First array 750 may be deployed based on a first activation signal. Second array 760 may be deployed based on a second activation signal different from the first activation signal. Third array 770 may be deployed based on a third activation signal different from the first activation signal and the second activation signal. Fourth array 780 may be deployed based on a fourth activation signal different from the first activation signal, the second activation signal, and the third activation signal. At least two arrays of the multiple arrays may comprise different numbers of electrodes. For example, a first number of the different numbers may comprise three electrodes and a second number of the different numbers may comprise two electrodes. The multiple arrays may comprise at least two three-electrode arrays and at least two two-electrode arrays. First array 750 may comprise a first three-electrode array. Second array 760 may comprise a second three-electrode array. Third array 770 may comprise a first two-electrode array. Fourth array 780 may comprise a second two-electrode array. While first array 750, second array 760, third array 770, and fourth array 780 are illustrated as comprising specific rows of electrodes of CEW 705, embodiments according to various aspects of the present disclosure may comprise different combinations of electrodes for arrays, including arrays in which electrodes of a same array are not adjacent to each other, disposed one of more rows of electrodes, and/or include different rows and/or columns of firing tubes of a conducted electrical weapon.

In various embodiments, deploying electrodes in the next array 620 may comprise deploying one or more electrodes of first array 710 or 750. In embodiments, deploying electrodes in the next array may comprise deploying one or more electrodes of second array 720 or 760, third array 730 or 770, or fourth array 780 with brief reference to FIG. 7A-7B.

Figure 6:
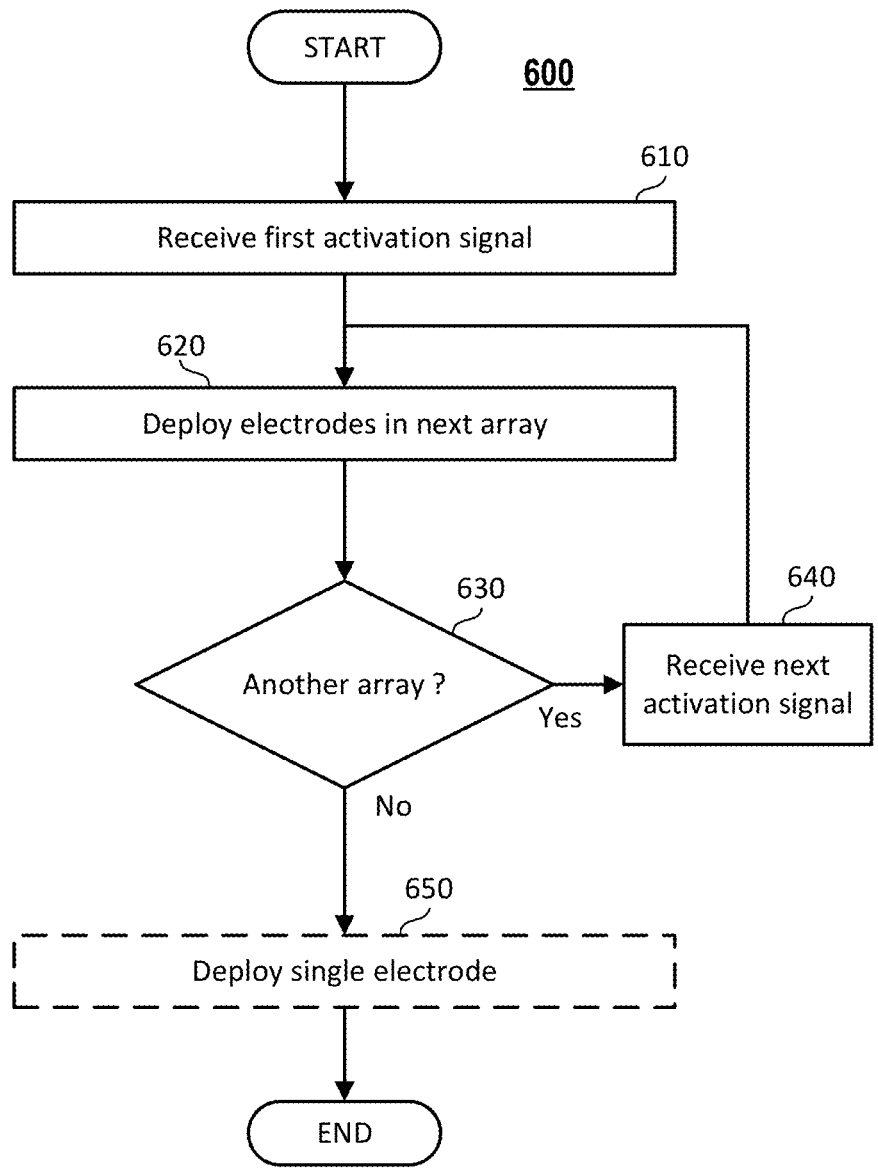
FIG. 6 illustrates a method of automatically deploying arrays of electrodes according to various aspects of the disclosure.

Responsive to deploying the one or more electrodes in the next array 620, and with reference to FIG. 6, determining whether another array is available 630 may be performed. Determining whether the other array is available may comprise detecting each firing tube of the conducted electrical weapon in which an undeployed electrode is provided. When a set of firing tubes associated with an array comprises a respective undeployed electrode, the next or other array (e.g., another array) may be determined to be available. For example, when a respective electrode is provided in each firing tube associated with second array 720 of CEW 700 after first array 710 has been deployed. When each firing tube of a set of firing tubes associated with an array does not comprise a respective undeployed electrode, the next or other array (e.g., the another array) may be determined to not be available. Alternately or additionally, when a number of undeployed electrodes associated with an array is determined to be available, another array may be determined to be available. For example, the other or next array may have an associated number of electrodes (e.g., two electrodes, three electrodes, at least two electrodes, at least three electrodes, etc.). When the predetermined number of undeployed electrodes is detected by the CEW, the other or next array may be determined to be available, independent of the firing tube in which each respective electrode of the predetermined number of undeployed electrodes is disposed.

Alternately or additionally, a conducted electrical weapon may be configured to deploy a predetermined sequence of arrays. When the most recently deployed array is not a last array in the predetermined sequence of arrays, the other array may be determined to be available. When the most recently deployed array is the last array in the predetermined sequence of arrays, the other array may be determined to not be available. For example, for a sequence of arrays comprising first array 750, second array 760, third array 770, and fourth array 780, the next array may be determined to be available when the previously deployed array comprises one of first array 750, second array 760, or third array 770, but not fourth array 780 with brief reference to FIG. 7B.

When the other array or the next array is determined to be available, receiving a next activation signal 740 may be performed. The next activation signal may comprise a subsequent or second activation signal different from an initial or first activation signal. The next activation signal may be received via a same user control interface of the conducted electrical weapon. Until the next activation signal is received, deploying the next array from the conducted electrical weapon may be prevented (e.g., disabled).

When the other array is determined to not be available, at least one single electrode may be deployed. The at least one single electrode may comprise a solitary electrode. The at least one single electrode may be deployed when a next activation signal is received. For example, the at least one single electrode may comprise electrode 740 with brief reference to FIG. 7A. The at least one single electrode may enable another electrode to be individually directed toward a target location after multiple prior electrodes have been deployed in one or more prior arrays. In other embodiments, a conducted electrical weapon may not include the at least one single electrode or be configured to deploy a single electrode after one or more arrays have been deployed. In such embodiments, when the other array is determined to not be available, method 600 may end.

Figure 8:
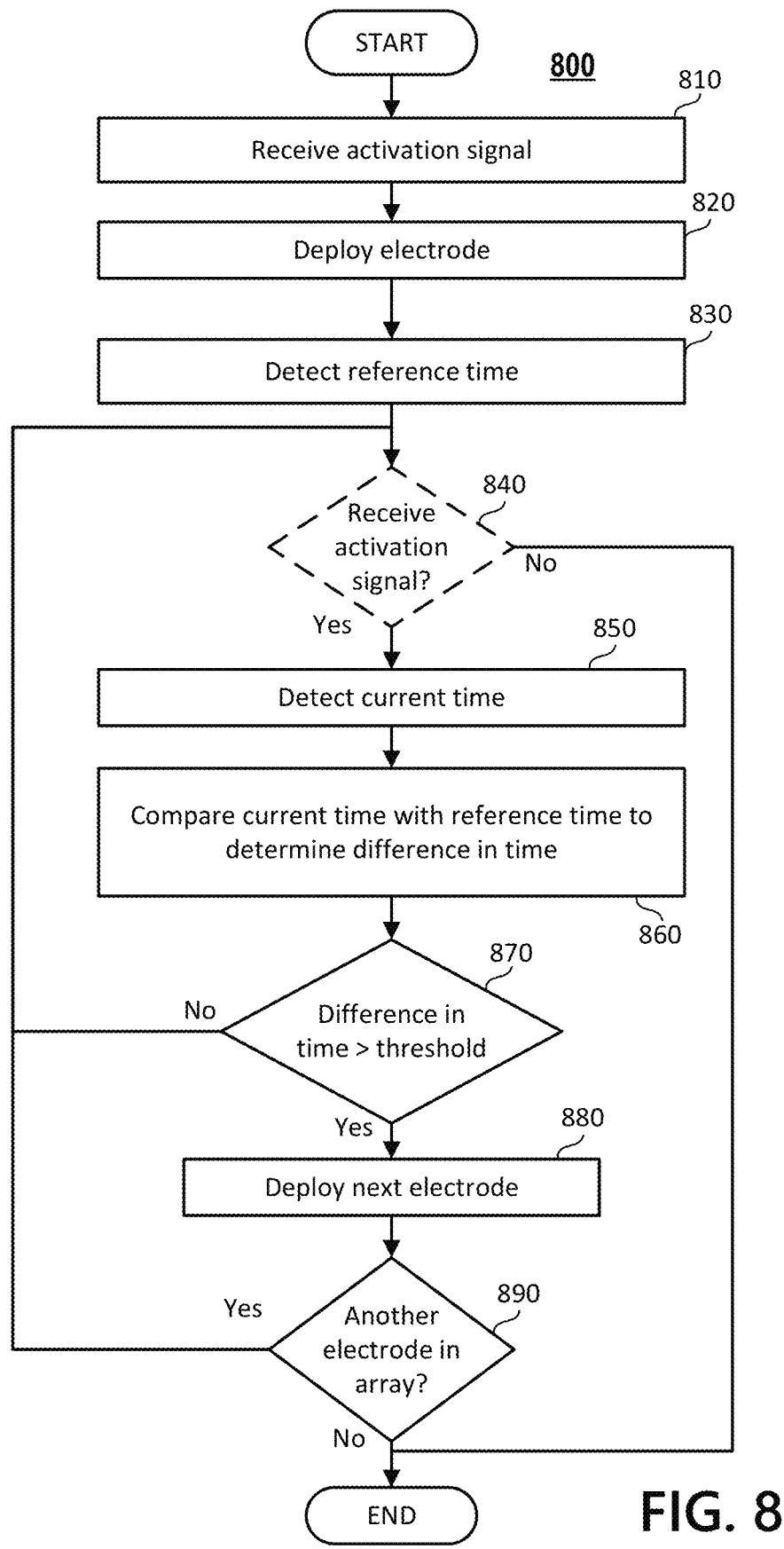
FIG. 8 illustrates a method of automatically deploying an electrode based on a change in time according to various aspects of the disclosure.

In various embodiments, a change associated with a conducted electrical weapon may comprise a change in time. Automatic electrode deployment based on a change in time of a conducted electrical weapon may be provided according to various aspects of the present disclosure. The change in time may enable deployment of one or more second electrodes to be determined automatically during movement of the conducted electrical weapon. An initial time at which a first electrode is deployed by the conducted electrical weapon may be selected and a subsequent time of deployment for each subsequent electrode may be automatically determined. The subsequent time of deployment may be automatically determined independent of a speed at which the conducted electrical weapon is moved (e.g., swept) along a target location, enabling each subsequent electrode to be rapidly selected. The subsequent time of deployment may be automatically determined independent of an amount by which the conducted electrical weapon is moved (e.g., swept) along a target location, enabling each subsequent electrode to be reliably deployed. For example, in accordance with various embodiments and with reference to FIG. 8, an exemplary method 800 for automatically deploying an electrode based on a change in time may be provided according to various aspects of the disclosure. Method 800 may be performed by a conducted electrical weapon. The conducted electrical weapon may be configured to conduct an electrical stimulus signal via a plurality of electrodes. Each electrode of the plurality of electrodes may be deployed from the conducted electrical weapon. The conducted electrical weapon may be configured to perform one or more operations as shown in FIG. 8 and/or otherwise disclosed in the present disclosure. The conducted electrical weapon may correspond to one or more CEWs disclosed herein, including CEW 100, CEW 200, CEW 300, and/or CEW 400 with brief reference to FIGS. 1-4.

Method 800 depicts one combination of blocks (e.g., operations) that may be implemented in accordance with one embodiment. Those of ordinary skill in the art will realize that method 800 and/or any other implementations herein may utilize additional and/or fewer blocks, components, and/or systems (including those discussed with respect to other figures and/or known in the art). Further, absent expressly indicating otherwise, the ordering of describing various implementations and blocks is merely for illustrative purposes and not intended to limit the scope of this disclosure. As understood by a person of ordinary skill in the art, a computer-readable medium comprising computer-executable instructions that are configured to be executed by a processor (e.g., processing circuit 110 comprising a processor and non-volatile memory storing the instructions, with brief reference to FIG. 1) may perform one or more processes disclosed herein.

Automatically deploying an electrode based on a change in time may comprise one or more of receiving an activation signal 810, deploying an electrode 820, detecting a reference time 830, detecting whether an activation signal continues to be received 840, detecting a current position 850, comparing a current time with a reference time to determine a difference in time 860, comparing the change in time to a threshold value 870, deploying a next electrode 880, or determining whether another electrode is included in an array 890 in embodiments according to various aspects of the present disclosure. In embodiments, one or more steps of method may comprise one or more respective features or characteristics of corresponding, respective steps of method 500 and/or method 600. For example, receiving an activation signal 810 may correspond to one or more of receiving an activation signal 510 and/or receiving an activation signal 610 according to various aspects of the present disclosure.

Receiving an activation signal 810 may comprise receiving an activation signal configured to deploy a first electrode of a plurality of electrodes from an at a first time. The activation signal may be received via a control interface of the conducted electrical weapon. The activation signal may be received by a processing circuit of the conducted electrical weapon. For example, the activation signal may be received via a trigger of the conducted electrical weapon.

In accordance with (e.g., based on) receiving the activation signal 810, deploying an electrode 820 may be performed. The electrode may comprise a first electrode. The electrode may comprise a first electrode of a plurality of electrodes the conducted electrical weapon is configured to deploy. The electrode may comprise a first electrode in an array of electrodes selectable in accordance with the activation signal. For example, the electrode may comprise one or more of first electrode 230-1, first electrode 330-1, or first electrode 430-1 with brief reference to FIGS. 2-4. The electrode may comprise a single electrode. For example, deploying the electrode 820 may comprise individually providing a single ignition signal to the first electrode of the plurality of electrodes. The single electrode may be deployed from the conducted electrical weapon responsive to the single ignition signal.

Deploying an electrode 820 may comprise deploying the electrode at a first position of the conducted electrical weapon. The position may comprise a first position in a sequence of positions at which an array of electrodes is deployed responsive to an activation signal. In embodiments, deploying an electrode 820 may correspond to deploying an electrode 520 with brief reference to FIG. 5.

In accordance with deploying the electrode 820, detecting a reference time 830 may be performed. Detecting the reference time 820 may comprise detecting a current time at which the electrode is deployed by the conducted electrical weapon. Detecting the reference time 820 may alternately or additionally comprise detecting a current time at which an activation signal is received by the conducted electrical weapon. The current time may be detected via a clock (e.g., clock circuit) of the conducted electrical weapon. For example, a processing circuit may comprise a clock configured to track a period of (e.g., maintain) time. The period of time may comprise one or more of an absolute time (e.g., time of day) or a relative time (e.g., duration of time elapsed relative to an initial time). The period of time may comprise a sequence of current times (e.g., current time values). In some embodiments, detecting the current time may comprise resetting a timer, wherein the current time comprise a default initial time or start time (e.g., zero milliseconds or other unit of time). Upon deployment of an electrode, a processing circuit may be configured to identify a current time of the period of time via the clock. Detecting the reference time 820 may comprise identifying, by the processing circuit (e.g., processing circuit 110 with brief reference to FIG. 1), the current time and storing the current time in a memory of the conducted electrical weapon. The current time may be stored in the conducted electrical weapon for subsequent processing by the conducted electrical weapon. Detecting the reference time 820 may comprise obtaining a current time via a processing circuit and storing the current time as the reference time for subsequent processing by the conducted electrical weapon. The reference time may comprise a first current time of a plurality of current times over which a plurality of electrodes is deployed from the conducted electrical weapon.

After deploying the electrode 820 and detecting a reference time 830, detecting a change in time may be performed. In embodiments, detecting the change in time may comprise one or more of detecting whether an activation signal continues to be received 840, detecting a current time 850, comparing a current time with a reference time to determine a change in time 860, or comparing the change in position to a threshold value 870.

In various embodiments, detecting a change in time may comprise detecting whether an activation signal continues to be received 840. The activation signal may be a same activation signal as detected upon receiving the activation signal 810. The activation may be received for a duration of time. The duration of time may comprise a continuous period of time. A user control interface of the weapon may be actuated during the duration of time to provide the activation signal. In embodiments, detecting whether an activation signal continues to be received 840 may correspond to detecting whether an activation signal continues to be received 540 with brief reference to FIG. 5. When the activation signal is not detected upon detecting 840, method 800 may end.

In various embodiments, detecting whether an activation signal continues to be received 840 may be optional. Method 800 may exclude detecting whether the activation signal continues to be received 840. Method 800 may comprise receiving an activation signal 810 in association with deploying a first electrode and then automatically deploy one or more next electrodes independent of whether an activation signal is subsequently received. A next electrode may be deployed independent of (e.g., without, regardless of, etc.) whether an activation signal is detected after the first electrode is deployed. The next electrode may be deployed in accordance with detecting a change in position, but independent of whether an activation signal, including a same activation signal associated with deploying the first electrode, continues to be received by the conducted electrical weapon. The activation signal associated with deploying the first electrode may be discontinued prior to deploying a next electrode (e.g., a second electrode) in an array of electrodes according to various aspects of the present disclosure.

In embodiments, and when the activation signal is detected upon detecting 840, detecting a current time 850 of the conducted electrical weapon may be performed. The current time may comprise a second current time. The current time may comprise a second current time of a period of time tracked by the conducted electrical weapon, different from a reference time. The current time may be chronologically subsequent (e.g., after) a reference time detected upon detecting 830. Detecting the current time 850 may correspond to detecting a reference time 830 repeated at a later time. Detecting the current time 850 may comprise detecting the current time after at least one previous electrode has been deployed. The current time may be detected via a processing circuit of the conducted electrical weapon. For example, a processing circuit may comprise a clock configured to generate a sequence of current times for a duration of time during use of the conducted electrical weapon. The current time may be detected via the processing circuit of the conducted electrical weapon via the position detector. The current time may comprise a relative time, absolute time, or elapsed time. Detecting the current time 850 may comprise storing the current time in a memory of the conducted electrical weapon (e.g., a memory of processing circuit 110 with brief reference to FIG. 1).

In embodiments, the current time may be detected independent of a position of the conducted electrical weapon. For example, detecting the current time 850 may comprise detecting the current time while the conducted electrical weapon is disposed at a same position as detecting a reference time 830 or a different position as detecting a reference time 830. The current time may be detected separate from information regarding a position of the conducted electrical weapon provided by a position sensor incorporated in the conducted electrical weapon. Accordingly, an extent to which a position of the conducted electrical weapon changes or does not change may be separately controlled for the conducted electrical weapon.

In accordance with detecting a current time 850, comparing a current time with a reference time 860 may be performed. The current time may comprise the current time detected at detecting a current time 850. The comparing 860 may be performed to determine (e.g., calculate, etc.) an amount of time. The amount of time may comprise a duration of time that has elapsed relative to the reference time. The amount of time may comprise a difference in time during use or activation of the conducted electrical weapon. The difference in position may comprise a difference in time between a first time at which a previous electrode was deployed and a current time. For example, the previous electrode may comprise one of an electrode deployed at deploying an electrode 820 or a next electrode deployed in a previous instance of deploying a next electrode 880 as further discussed below. The first time may comprise one or more of a reference time and a previous current time detected at a previous instance of detecting a current time 850 performed immediately prior to previously deploying the next electrode at a previous instance of deploying the next electrode 880. Comparing the current position and the reference position 860 may comprise subtracting the reference time from the current time to determine the difference in time. In embodiments, comparing 860 may comprise identifying the current time, wherein the current time itself indicates an elapsed time.

In accordance with the comparing 860, comparing the difference in time to a threshold value 870 may be performed. The threshold value may be configured to enable deployment of another electrode at a predetermined delay (e.g., duration of time, elapsed time, etc.) relative to a time at which a previous electrode was deployed toward a target location from the conducted electrical weapon. The threshold value may be selected based on an average and/or estimated speed of movement (e.g., average change in position) of the conducted electrical weapon after deployment of an electrode. The threshold may be selected such that, based on the average and/or estimated speed of movement, a subsequently deployed electrode would be estimated to obtain a minimum spacing relative to a previously deployed electrode at the target location. The threshold value may be selected to provide a minimum delay necessary for the conducted electrical weapon to be repositioned to obtain the minimum spacing. The threshold value may comprise a threshold time (e.g., threshold time value, threshold delay, etc.). For example, the threshold value may comprise a value of equal to or less than 0.25 seconds, equal to or less than 0.5 seconds, equal to or less than 0.75 seconds, equal to or less than 1.0 seconds, or equal to or less than 2.0 seconds. When the difference in time is equal or greater than the threshold value (e.g., exceeds the threshold time), the change in time may be detected in accordance with various aspects of the present disclosure. When the difference in time is equal or greater than the threshold value, the change in time may be detected in accordance with the comparing 870. When the difference in time is less than the threshold value, the change in time may not be detected in accordance with the comparing 870. When the change in time is not detected in accordance with comparing 870, detecting 840 may be repeated at a next time.

When the change in time is detected, automatically deploying a next electrode 880 may be performed. The next electrode may comprise a second electrode. The second electrode may be automatically deployed after a first electrode. For example, the next electrode may comprise one or more of second electrode 130-2, second electrode 230-2, or second electrode 330-2 with brief reference to FIGS. 1, 2B and 3 respectively.

Deploying a next electrode 880 may comprise deploying the electrode at a second time. The time may comprise the second current time detected in a most recently performed instance of detecting a current time 850. The second time may comprise a second time in a period of time in which an array of electrodes is deployed responsive to an activation signal. The time may comprise an intermediate time of a duration of time in which the activation signal is received by the conducted electrical weapon. The duration of time may comprise a continuous period of time from the first time to the time at which the next electrode is deployed.

In embodiments, deploying the next electrode 880 may correspond to deploying a next electrode 580 with brief reference to FIG. 5. For example, deploying the next electrode 890 may comprise one or more of generating an audible indicator. The next electrode may comprise a subsequent electrode in an array of electrodes. For example, the next electrode may comprise a third electrode. The third electrode may be automatically deployed after a second electrode was automatically deployed at a previous performance of automatically deploying 880. The third electrode may be automatically deployed in accordance with a third time. The third time may be determined relative to a previous time at which a first electrode in an array was deployed and/or a previous time at which a next electrode in the array was deployed. In embodiments, one or more operations for detecting the change in time may be repeated for automatically deploying each subsequent electrode in an array of electrodes after a first electrode in the array. In embodiments, and in accordance with automatically deploying a next electrode 880, determining whether another electrode 890 is included in an array of electrodes. Determining whether another electrode 890 is included may correspond to determining whether another electrode 590 is included with brief reference to FIG. 5. When another electrode is not included in the array at determining 890, method 800 may end.

When another next electrode is included in the array and not yet deployed at determining 890, detecting 840 may be repeated for the next another electrode. Repeating detecting 840 may comprise setting a current time detected at detecting a current time 850 to a reference time. Repeating detecting 840 may comprise setting a current time detected at a previous instance of detecting a current time 850 prior to deploying an electrode 880 to a reference time. For example, a time delay may be applied between each pair of sequential electrodes deployed in an array of electrodes. In such an arrangement, a same threshold value may be employed for next electrode in an array of electrodes. Alternately, or additionally, a reference time may be maintained as detected upon detecting reference time 830. In such an arrangement, each electrode deployed after a first electrode may be delayed relative the current time at which a first electrode in an array of electrodes is deployed.

In embodiments, a different threshold value may be applied for a next electrode in an array of electrodes. Each next electrode may be associated with a different threshold value. The threshold value may be different in accordance with an order in which the electrode is deployed in the array of electrodes. For example, a second electrode in an array of electrodes may be deployed upon a first time difference being determined (e.g., upon comparing 870) to be equal or greater than a first threshold value and a third electrode in the array of electrodes may be deployed upon a second time difference being determined (e.g., upon comparing 870) to be equal or greater than a second threshold value different from the first threshold value.

In embodiments, the threshold value may increase for a next electrode in the array of electrodes. The threshold value may increase for each next electrode in the array of electrodes. For example, a first threshold value compared to a first time difference between a current time of deployment of a first electrode (e.g., reference time) and a current time of deployment of a second electrode in an array of electrodes may be greater than a second time difference between the current time of deployment of the second electrode and a current time of deployment of a third electrode in an array of electrodes. For example, the first threshold value may be less than 0.5 seconds, while the second threshold value may be greater than 0.5 seconds. A third threshold value, compared to a time difference between the current time of the third electrode and a current time associated with deploying a fourth electrode in the array of electrodes, may further be greater than the second threshold value. Alternately or additionally, a threshold value may comprise a same threshold value between two pairs of electrodes deployed in an array of electrodes.

In various embodiments, systems, methods, and devices are provided for automatically deploying an electrode from a conducted electrical weapon in accordance with a change detected by the electrode. The change may comprise a change in position, such as discussed in accordance with method 500, and/or a change in time, such as discussed in accordance with method 800 with brief reference to FIGS. 5 and 8. The change detected by the conducted electrical weapon may be independent of (e.g., without, regardless of, separate from, distinct from, etc.) an activation signal or other input received via a user control interface of the conducted electrical weapon. A second electrode may be automatically deployed by the conducted electrical weapon after a first electrode may be selectively deployed from the conducted electrical weapon. For example, a method performed by a conducted electrical weapon configured to conduct an electrical stimulus signal via a plurality of electrodes may comprise deploying a first electrode of the plurality of electrodes at a first time and, in accordance with deploying the first electrode, automatically deploying a second electrode of the plurality of electrodes. The first electrode and second electrode may each comprise a respective single, individually deployed electrode. An ignition signal may be provided from a handle of the conducted electrical weapon to an individual deployment unit comprising each electrode to launch each electrode in the array of electrodes. Such an arrangement may comprise one or more features, characteristics, and/or steps discussed with respect to method 500 and/or method 800 with brief reference to FIGS. 5 and 8.

Various additional steps, features, characteristics, or combinations thereof may be included in any one of the example embodiments disclosed herein. In any one of the example embodiments disclosed herein, the position sensor may comprise a gyroscope. In any one of the example embodiments disclosed herein, the conducted electrical weapon may further comprise a plurality of unitary cartridges, wherein each cartridge of the plurality of cartridges includes a different respective electrode of the plurality of electrodes.

In any one of the example embodiments disclosed herein, the first electrode may be deployed in accordance with an activation signal received via a user control interface of the conducted electrical weapon. In any one of the example embodiments disclosed herein, the first electrode may be deployed immediately based on the activation signal being received via the user control interface. In any one of the example embodiments disclosed herein, methods or operations may further comprise receiving the activation signal for a duration of time. The duration of time may comprise a continuous period of time. Alternately or additionally, a trigger of the user control interface may be actuated for the duration of time to provide the activation signal. Alternately or additionally, the first electrode may be deployed at a beginning of the duration of time. Alternately or additionally, the activation signal may be continuously received between deploying the first electrode and automatically deploying the second electrode.

In any one of the example embodiments disclosed herein, deploying the first electrode may comprise deploying a single first electrode. Alternately or additionally, automatically deploying the second electrode may comprise deploying a single second electrode. Alternately or additionally, the second electrode may be automatically deployed independent of whether the activation signal may be received at a second time at which the second electrode is deployed. Alternately or additionally, the activation signal may not be received at the second time at which the second electrode is automatically deployed. Alternately or additionally, the activation signal may be terminated prior to automatically deploying the second electrode.

In any one of the example embodiments disclosed herein, the change in position may comprise an angle between a first direction of the weapon and a second direction of the weapon. Alternately or additionally, detecting the change in position may comprise detecting, via the position detector, the first direction of the conducted electrical weapon at a first time the first electrode is deployed. Alternately or additionally, detecting the change in position may comprise detecting, via the position detector, the second direction of the conducted electrical weapon different from the first direction. Alternately or additionally, detecting the change in position may comprise comparing the angle to an angle threshold value. Alternately or additionally, comparing the angle may comprise determining the angle may be equal or greater than the angle threshold value. In some embodiments, the angle threshold value may be five degrees. Alternately or additionally, the angle threshold value may be greater than three degrees. Alternately or additionally, the angle may be determined within a single plane of motion. In some embodiments, the single plane may comprise a vertical plane of motion. Alternately or additionally, the single plane may comprise a diagonal plane of motion.

In any one of the example embodiments disclosed herein, the change in position may comprise a distance between a first spatial location of the conducted electrical weapon and a second spatial location of the conducted electrical weapon. Alternately or additionally, the change in position may comprise detecting, via the position detector, the first spatial location of the conducted electrical weapon at a first time the first electrode is deployed. Alternately or additionally, detecting the change in position may comprise detecting, via the position detector, the second spatial location of the conducted electrical weapon different from the first spatial location. Alternately or additionally, detecting the change in position may comprise comparing the distance to a distance threshold value. Alternately or additionally, comparing the distance may comprise determining the distance may be equal or greater than the distance threshold value. In some embodiments, the distance threshold value may be five inches. Alternately or additionally, the distance threshold value may be greater than three inches. Any one of the example embodiments above, wherein the distance may comprise a linear distance between the first spatial location and the second spatial location.

In any one of the example embodiments disclosed herein, detecting the change in position may comprise detecting a change in targeted location. Alternately or additionally, the change in targeted location may be detected relative to a target location remote from the conducted electrical weapon. Alternately or additionally, the change in targeted location may comprise a spacing. Alternately or additionally, the change in targeted location may comprise a spacing at a remote location relative to a spatial location of the conducted electrical weapon. Alternately or additionally, detecting the change in position may comprise detecting a first position of the conducted electrical weapon at a first time at which the first electrode is deployed. Alternately or additionally, detecting the first position may comprise detecting a first distance between the conducted electrical weapon and the target location at the first time. Alternately or additionally, detecting the first position may comprise detecting a first targeted location. Alternately or additionally, detecting the change in position may comprise detecting a second position of the conducted electrical weapon after a first time at which the first electrode is deployed. Alternately or additionally, the second position may comprise detecting a second distance between the conducted electrical weapon and the target location after the first time. Alternately or additionally, detecting the second position may comprise detecting a second targeted location different from a first targeted location. Alternately or additionally, detecting the change in position may comprise detecting a spacing between the first targeted location and the second targeted location. Alternately or additionally, detecting the change in position may comprise comparing the spacing to a spacing threshold value. In some embodiments, comparing the spacing may comprise determining the spacing may be equal or greater than the spacing threshold value. Alternately or additionally, automatically deploying the second electrode may comprise automatically deploying the second electrode based on the spacing being determined to be equal or greater than the spacing threshold value. In some embodiments, the spacing threshold value may be six inches. Alternately or additionally, the spacing threshold value may be one or more of at least five inches, at least six inches, at least seven inches, at least nine inches, or at least twelve inches. Alternately or additionally, detecting the change in targeted location may comprise detecting the change in targeted location independent of a difference in time between the first electrode being deployed and the second electrode being deployed.

In any one of the example embodiments disclosed herein, methods or operations may further comprise measuring a distance between the conducted electrical weapon and a location of the target. In some embodiments, the distance may be measured via the first electrode and the second electrode. In some embodiments, the distance may be detected via a position detector of the conducted electrical weapon.

In any one of the example embodiments disclosed herein, determining an adjusted threshold value in accordance with the distance between the conducted electrical weapon and the location of the target. Alternately or additionally, the methods or operations may further comprise automatically deploying a third electrode based on a second change in position and the adjusted threshold value.

In any one of the example embodiments disclosed herein, a third electrode may automatically be deployed. Alternately or additionally, after automatically deploying the second electrode, detecting a second change in position of the conducted electrical weapon via the position detector of the conducted electrical weapon; and in accordance with the second change in position, automatically deploying a third electrode of the plurality of electrodes. Alternately or additionally, the second change in position may comprise one or more of a second distance, a second angle of orientation, or second spacing. Alternately or additionally, detecting the second change in position may comprise detecting one or more of: a third spatial location different from the first spatial location and the second spatial location; a third targeted location; and a third angle of orientation, different from the first angle and the second angle. Alternately or additionally, the second distance may be determined between the third spatial location and one of the first spatial location and the second spatial location. Alternately or additionally, the second angle may be determined between the third orientation and one of the first orientation and the second orientation. Alternately or additionally, detecting the second change in position may comprise detecting a third position of the conducted electrical weapon and comparing the third position to the first position to determine the second change in position. Alternately or additionally, detecting the second change in position may comprise comparing the second change of position to a threshold value. Alternately or additionally, the threshold value may be a same threshold value to which the change in position is compared. Alternately or additionally, detecting the second change in position may comprise determining the second change of position exceeds the position change threshold value.

In any one of the example embodiments disclosed herein, an array of the plurality of electrodes may be deployed. Alternately or additionally, the methods or operations may comprise deploying multiple arrays of electrodes, wherein a first array of the multiple arrays of electrodes may comprise the first electrode and the second electrode. In some embodiments, each array of the multiple arrays may be deployed in accordance with a different respective activation signal received by the conducted electrical weapon. Alternately or additionally, each array of the multiple arrays may comprise a same number of electrodes. Alternately or additionally, two arrays of the multiple arrays may comprise different numbers of electrodes Alternately or additionally, a first number of the different numbers may comprise three electrodes and a second number of the different numbers may comprise two electrodes. Alternately or additionally, the first array may comprise a third electrode different from the first electrode and the second electrode. Alternately or additionally, a second array of the multiple arrays may comprise two electrodes, different from the first electrode and the second electrode. Alternately or additionally, a second array of the multiple arrays may comprise three electrodes, different from the first electrode and the second electrode. Alternately or additionally, the first array may comprise a first three-electrode array and a second array of the multiple arrays may comprise a second three-electrode array. Alternately or additionally, the multiple arrays may comprise three arrays. Alternately or additionally, each array of the three arrays may comprise at least two electrodes. Alternately or additionally, each array of the three arrays may comprise at least three electrodes. Alternately or additionally, the multiple arrays comprise at least one three-electrode array and at least one two-electrode array. Alternately or additionally, the multiple arrays comprise at least two three-electrode arrays and at least two two-electrode arrays. Alternately or additionally, the methods or operations may further comprise: deploying a first array of the plurality of electrodes in accordance with receiving a first activation signal via a user control interface of the conducted electrical weapon; and deploying a second array of the plurality of electrodes different from the first array in accordance with receiving a second activation signal via a user control interface of the conducted electrical weapon, wherein the first array may comprise the first electrode and the second electrode.

In any one of the example embodiments disclosed herein, the methods or operations may further comprise: generating, via an audio transducer of the conducted electrical weapon, a first audible indicator in accordance with deploying the first electrode; and generating, via the audio transducer, a second audible indicator in accordance with deploying the second electrode, wherein the first audible indicator is different from the second audible indicator. Alternately or additionally, the second electrode may be the last electrode in an array of electrodes comprising the first electrode and second electrode. Alternately or additionally, the conducted electrical weapon may be configured to deploy each electrode of the array of electrodes based on a same activation signal. Alternately or additionally, the array of electrodes may comprise one or more intermediate electrodes deployed in series between the first electrode and the second electrode, and wherein the first audible indicator may be generated in accordance with deploying each intermediate electrode of the one or more intermediate electrodes. Alternately or additionally, the first audible indicator may comprise a first tone with one or more of a first length and first frequency and the second audible indicator may comprise a second tone with one or more of a second length and second frequency. Alternately or additionally, the methods or operations may comprise deploying a third electrode of the plurality of electrodes prior to the first electrode; and responsive to deploying the third electrode, generating via the audio transducer, the first audible indicator.

In example embodiments according to various aspects of the present disclosure, a method may be provided. The method may be performed by a conducted electrical weapon configured to conduct an electrical stimulus signal via a plurality of electrodes. The method may comprise: deploying a first electrode of the plurality of electrodes; in accordance with deploying the first electrode, detecting a change associated with the conducted electrical weapon; and in accordance with the change, automatically deploying a second electrode of the plurality of electrodes. Alternately or additionally, the method may comprise deploying a first electrode of the plurality of electrodes; in accordance with deploying the first electrode, detecting a change in time via the conducted electrical weapon; and in accordance with the change in time, automatically deploying a second electrode of the plurality of electrodes.

In example embodiments according to various aspects of the present disclosure, a conducted electrical weapon may be provided. The conducted electrical weapon may be configured to conduct an electrical stimulus signal through a target, the weapon comprising: a plurality of electrodes including a first electrode and a second electrode; and a processing circuit coupled to the plurality of electrodes, wherein the processing circuit is further configured to perform operations, comprising: deploying the first electrode at a first time; in accordance with deploying the first electrode, detecting a change in time relative to the first time; and in accordance with the change in time, automatically deploying the second electrode at a second time.

In example embodiments according to various aspects of the present disclosure, a handle of a conducted electrical weapon may be provided. The handle of the conducted electrical weapon may be configured to conduct an electrical stimulus signal, the handle comprising: a signal generator configured to provide a plurality of ignition signals; and a processing circuit coupled to the signal generator and configured to electrically couple the plurality of ignition signals to a plurality of electrodes received by the handle, wherein the processing circuit is further configured to perform operations, comprising: providing a first ignition signal of the plurality of ignition signals to a first electrode of the plurality of electrodes; in accordance with providing the first ignition signal, detecting a change in time; and in accordance with the change in time, automatically providing a second ignition signal to a second electrode of the plurality of electrodes.

In any one of the example embodiments disclosed herein, the change may comprise one or more of a change in position or a change in time. Alternately or additionally, the change in time may comprise a time difference relative to a first time at which the first electrode is deployed and a current time after the first time. Alternately or additionally, the change in time may comprise an elapsed time after a first time at which the first electrode is deployed. Alternately or additionally, the processing circuit may comprise a clock and detecting the change in time may comprise detecting, via the clock, the first time. Alternately or additionally, the processing circuit may comprise a clock and detecting the change in time may comprise detecting, via the clock, the current time. Alternately or additionally, detecting the change in time may comprise comparing the time difference to a time threshold value. Alternately or additionally, comparing the time difference may comprise determining the time difference is equal or greater than the time threshold value. In some embodiments, the time threshold value may be less than 0.25 seconds. Alternately or additionally, the time threshold value may be one or more of less than 0.5 seconds, less than 0.75 seconds, less than 1.0 seconds, or less than 2.0 seconds. Alternately or additionally, detecting the change in time may comprise detecting the change in time independent of a change in position of the conducted electrical weapon.

In any one of the example embodiments disclosed herein, detecting the change in time may comprise detecting the change in time independent of whether an activation signal is received by the conducted electrical weapon after the first time.

The foregoing description discusses implementations (e.g., embodiments), which may be changed or modified without departing from the scope of the present disclosure. Examples listed in parentheses may be used in the alternative or in any practical combination. As used in the specification and illustrative embodiments, the words 'comprising,' 'comprises,' 'including,' 'includes,' 'having,' and 'has' introduce an open-ended statement of component structures and/or functions. In the specification and illustrative embodiments, the words 'a' and 'an' are used as indefinite articles meaning 'one or more'. In the illustrative embodiments, the term "provided" is used to definitively identify an object that not a claimed or required element but an object that performs the function of a workpiece. For example, in the illustrative embodiment "an apparatus for aiming a provided barrel, the apparatus comprising: a housing, the barrel positioned in the housing", the barrel is not a claimed or required element of the apparatus, but an object that cooperates with the "housing" of the "apparatus" by being positioned in the "housing."

The location indicators "herein," "hereunder," "above," "below," or other word that refer to a location, whether specific or general, in the specification shall be construed to refer to any location in the specification whether the location is before or after the location indicator.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods.

The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. As used herein, numerical terms such as "first", "second", and "third" may refer to a given set of one or more elements, independent of any order associated with such set. For example, a "first" electrode may include a given electrode that may be deployed before or after a "second" electrode, absent further recited limitations of order.

What is claimed is:

1. A method performed by a conducted electrical weapon configured to conduct an electrical stimulus signal via a plurality of electrodes, the method comprising:
    deploying a first electrode of the plurality of electrodes;
    in accordance with deploying the first electrode, detecting a change in position of the conducted electrical weapon via a position detector of the conducted electrical weapon; and
    in accordance with the change in position, automatically deploying a second electrode of the plurality of electrodes.

2. The method of claim 1, wherein detecting the change in position comprises detecting, via the position detector, a first position of the conducted electrical weapon at a first time at which the first electrode is deployed.

3. The method of claim 1, wherein detecting the change in position comprises detecting, via the position detector, a second position of the conducted electrical weapon after the first electrode is deployed and prior to automatically deploying the second electrode.

4. The method of claim 1, wherein detecting the change in position comprises comparing a first position of the conducted electrical weapon to a second position of the conducted electrical weapon to determine a difference in position.

5. The method of claim 4, wherein detecting the change in position comprises determining the difference in position is greater than a threshold value to detect the change in position.

6. The method of claim 5, wherein the threshold value comprises at least one of an angle threshold value, a distance threshold value, or a spacing threshold value.

7. The method of claim 4, wherein detecting the change in position comprises determining the difference in position is less than a threshold value; and
    responsive to determining the difference in position is less than the threshold value, repeating detection of the second position prior to automatically deploying the second electrode of the plurality of electrodes.

8. The method of claim 1, wherein detecting the change in position of the conducted electrical weapon comprises detecting at least one of:
    an angle between a first direction of the conducted electrical weapon and a second direction of the conducted electrical weapon; or
    a distance between a first spatial location of the conducted electrical weapon and a second spatial location of the conducted electrical weapon.

9. The method of claim 8, wherein detecting the change in position further comprises:
    detecting a distance between the conducted electrical weapon and a remote location at a first time at which the first electrode is deployed; and
    detecting a spacing at the remote location in accordance with the distance between the conducted electrical weapon and the remote location and the at least one of the angle between the first direction of the conducted electrical weapon and the second direction of the conducted electrical weapon or the distance between the first spatial location of the conducted electrical weapon and the second spatial location of the conducted electrical weapon.

10. The method of claim 1, wherein automatically deploying the second electrode comprises automatically deploying a single electrode in accordance with the change in position.

11. A conducted electrical weapon configured to conduct an electrical stimulus signal through a target, the conducted electrical weapon comprising:
    a plurality of electrodes including a first electrode and a second electrode;
    a position sensor configured to detect a plurality of positions of the conducted electrical weapon; and
    a processing circuit coupled to the plurality of electrodes and the position sensor, wherein the processing circuit is further configured to perform operations, comprising:
        deploying the first electrode at a first time;
        in accordance with deploying the first electrode, detecting a change in position of the conducted electrical weapon via the position sensor; and
        in accordance with the change in position, automatically deploying the second electrode at a second time after the first time.

12. The conducted electrical weapon of claim 11, wherein the position sensor comprises at least one of a movement sensor and a rotation sensor.

13. The conducted electrical weapon of claim 12, wherein the position sensor further comprises a distance sensor configured to detect a distance between the conducted electrical weapon and the target at the first time at which the first electrode is deployed.

14. The conducted electrical weapon of claim 11, wherein detecting the change in position comprises:
    detecting, via the position sensor, a first position of the conducted electrical weapon at the first time at which the first electrode is deployed;
    detecting, via the position sensor, a second position of the conducted electrical weapon at the second time after the first time at which the first electrode is deployed;
    comparing the first position to the second position to determine a difference in position; and
    determining the difference in position is greater than a threshold value to detect the change in position.

15. The conducted electrical weapon of claim 11, wherein the change in position of the conducted electrical weapon comprises at least one of:

an angle between a first direction of the conducted electrical weapon and a second direction of the conducted electrical weapon;

a distance between a first spatial location of the conducted electrical weapon and a second spatial location of the conducted electrical weapon; or a spacing between a first targeted location remote from the conducted electrical weapon and a second targeted location remote from the conducted electrical weapon.

16. The conducted electrical weapon of claim 11, wherein the operations further comprise:

after automatically deploying the second electrode, detecting a second change in position of the conducted electrical weapon via the position sensor of the conducted electrical weapon; and in accordance with the second change in position, automatically deploying a third electrode of the plurality of electrodes at a third time after the second time, wherein each of the first electrode, the second electrode, and the third electrode is deployed responsive to a same activation signal received via a control interface of the conducted electrical weapon.

17. A handle of a conducted electrical weapon configured to conduct an electrical stimulus signal, the handle comprising:

a position detector configured to detect a plurality of positions of the handle of the conducted electrical weapon; and a processing circuit coupled to the position detector and configured to electrically couple the electrical stimulus signal to a plurality of electrodes received by the handle, wherein the processing circuit is further configured to perform operations, comprising:

providing a first ignition signal to a first electrode of the plurality of electrodes;

in accordance with providing the first ignition signal, detecting a change in position of the handle of the conducted electrical weapon via the position detector; and in accordance with the change in position, automatically providing a second ignition signal to a second electrode of the plurality of electrodes.

18. The handle of claim 17, wherein the position detector comprises at least one of a gyroscope, accelerometer, or an inertial measurement unit integrated with the handle of the conducted electrical weapon.

19. The handle of claim 17, wherein the change in position comprises at least one of:

a rotation of the handle of the conducted electrical weapon;

a movement of the handle of the conducted electrical weapon along one or more axes of motion; or a change in targeted location at a target location remote from the handle of the conducted electrical weapon.

20. The handle of claim 17, wherein detecting the change in position comprises:

detecting, via the position detector, a first position of the handle of the conducted electrical weapon at a first time at which the first ignition signal is provided;

detecting, via the position detector, a second position of the handle of the conducted electrical weapon at a second time after the first time at which the first ignition signal is provided; and detecting the change in position in accordance with a difference in position between the first position and the second position, wherein:

the first position comprises at least one of a first direction of the handle of the conducted electrical weapon or a first spatial position of the handle of the conducted electrical weapon; and the second position comprises at least one of a second direction of the handle of the conducted electrical weapon or a second spatial position of the handle of the conducted electrical weapon.

\* \* \* \* \*